Aug. 24, 1965  A. B. FLY ET AL  3,202,108
PUMPING METHOD AND APPARATUSES
Filed March 3, 1961  11 Sheets-Sheet 1
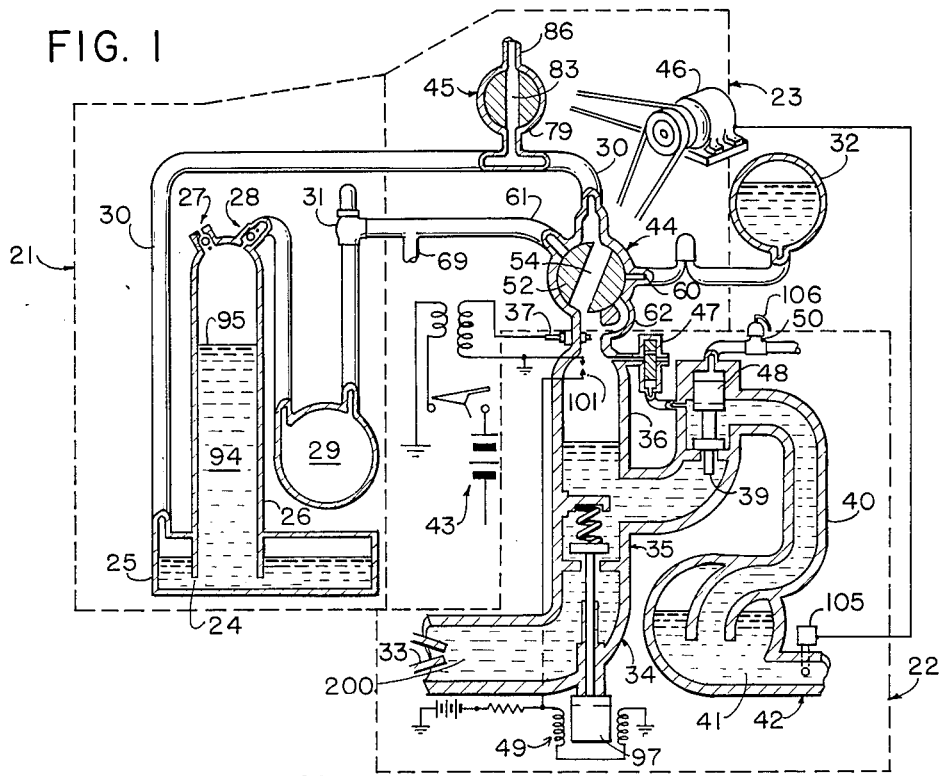
INVENTORS
A. B. FLY & W. D. MCDEARMAN
BY
Ely Silverman
ATTORNEY Aug. 24, 1965  A. B. FLY ET AL  3,202,108
PUMPING METHOD AND APPARATUSES
Filed March 3, 1961  11 Sheets-Sheet 2

INVENTORS
A. B. FLY & W. D. MCDEARMAN
BY
*Ely Silverman*
ATTORNEY

INVENTORS
A. B. FLY & W. D. MCDEARMAN
BY
Ely Silverman
ATTORNEY

Aug. 24, 1965      A. B. FLY ET AL      3,202,108
PUMPING METHOD AND APPARATUSES
Filed March 3, 1961      11 Sheets-Sheet 5

*INVENTORS.*
A. B. FLY & W. D. McDEARMAN
BY
Ely Silverman
ATTORNEY

Aug. 24, 1965   A. B. FLY ET AL   3,202,108
PUMPING METHOD AND APPARATUSES
Filed March 3, 1961   11 Sheets-Sheet 7

INVENTORS
A. B. FLY & W. D. MCDEARMAN
BY
Ely Silverman
ATTORNEY

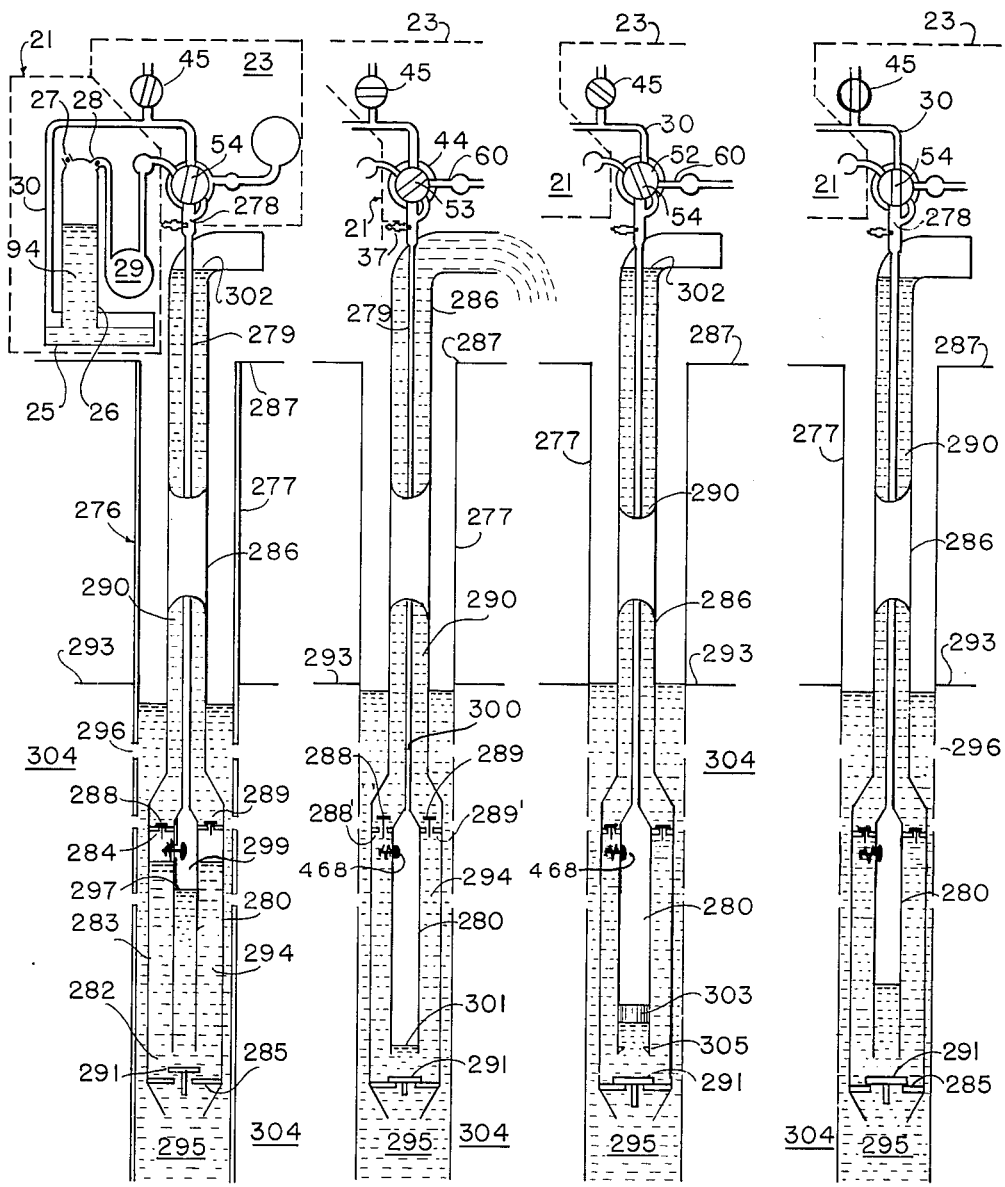

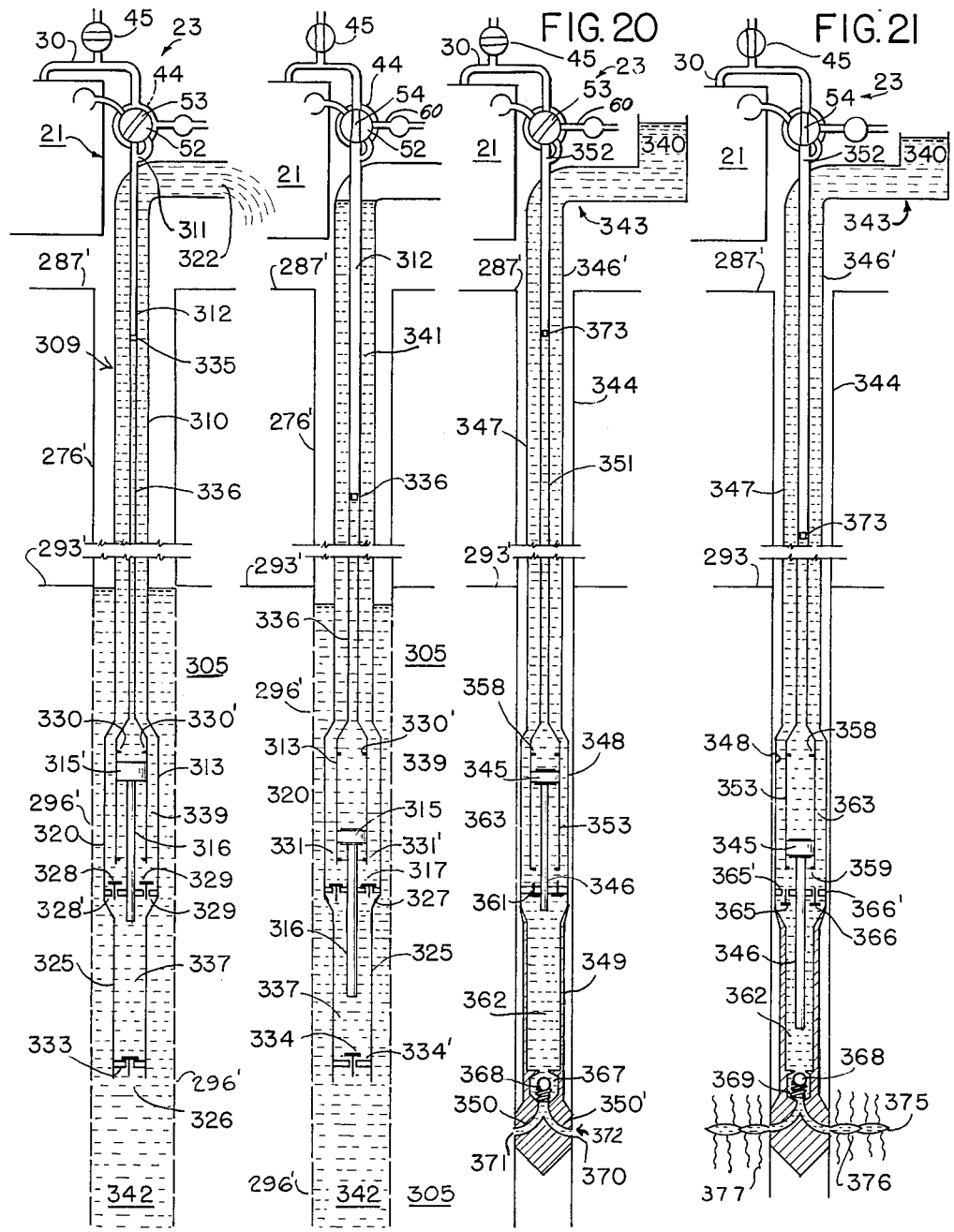

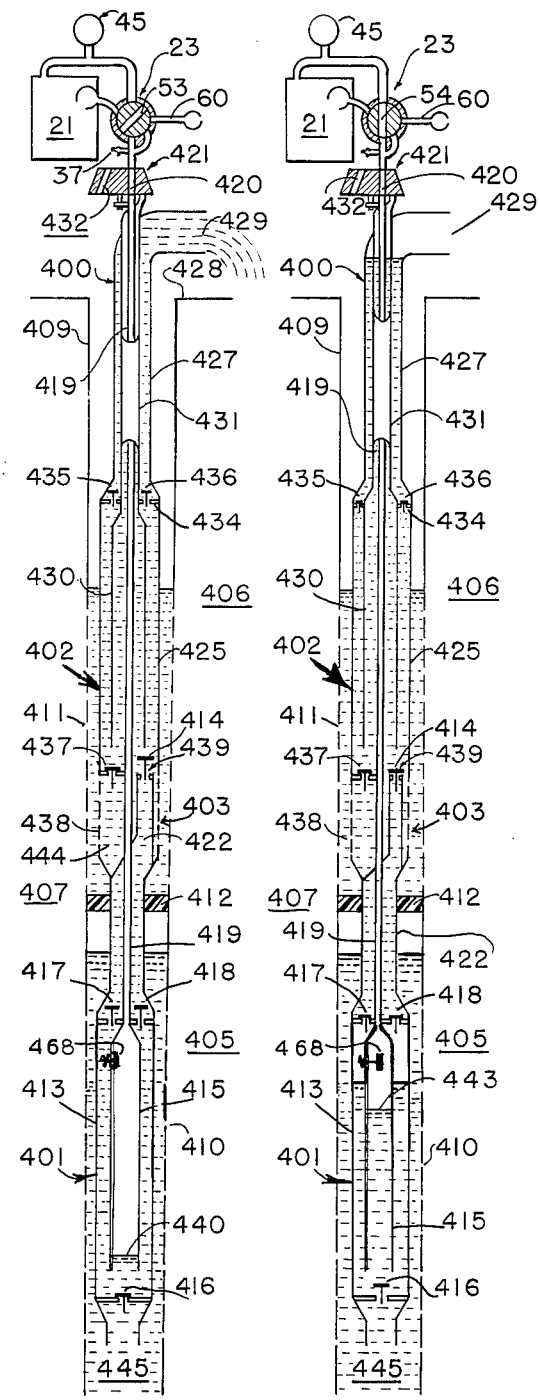

Aug. 24, 1965    A. B. FLY ET AL    3,202,108
PUMPING METHOD AND APPARATUSES
Filed March 3, 1961    11 Sheets-Sheet 11
FIG. 22
FIG. 27
FIG. 28
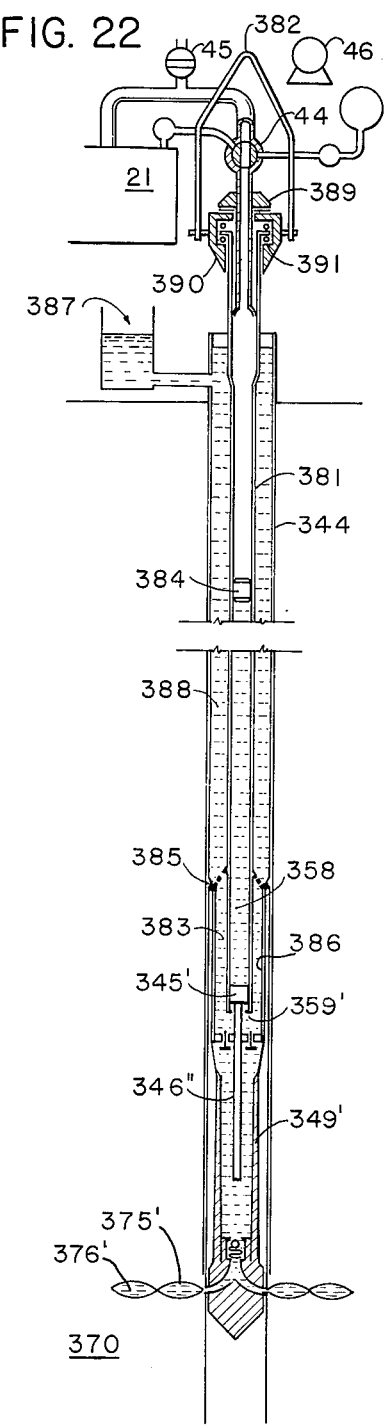
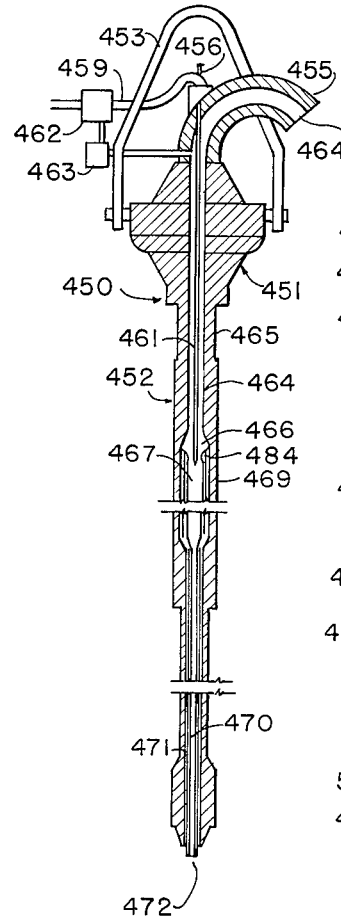
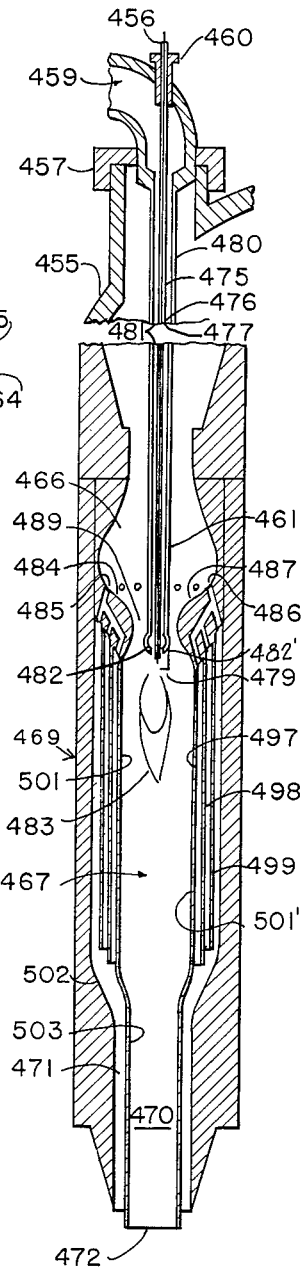
*INVENTORS.*
A. B. FLY & W. D. MCDEARMAN
BY
*Ely Silverman*
ATTORNEY United States Patent Office 3,202,108
Patented Aug. 24, 1965

3,202,108
PUMPING METHOD AND APPARATUSES
Anderson Billy Fly and William David McDearman, Jr., Amarillo, Tex., assignors, by mesne assignments to Hydro-Torq Pump Company, Inc., Amarillo, Tex., a corporation of Texas
Filed Mar. 3, 1961, Ser. No. 93,110
14 Claims. (Cl. 103—249)

This invention relates to a new and useful method and apparatuses for pumping fluids.

One object of this invention is to provide an improved method of pumping fluids.

Another object of this invention is to provide high pressure pumping apparatuses with few moving parts and great flexibility of operation.

Still another object of this invention is to provide method and apparatuses for high pressure pumping of liquids.

Still another object of this invention is to provide method and apparatuses for high pressure pumping of gases.

A further object of this invention is to provide pumping apparatuses of low weight, economical construction and sturdy components.

Yet another object of this invention is to provide a method and apparatus for pumping liquids of improved efficiency.

A further object of this invention is to provide a mechanical drive assembly utilizing the high pressure fluid developed by the pumping devices of this invention, and combined therewith.

Yet a further object of this invention is to provide an improved underground well pumping unit at moderate depths.

Yet another object of this invention is to provide an underground well pump unit for extreme well depths.

Yet another object of this invention is to provide an improved method and apparatus for fracturing underground formations.

Yet another object of this invention is to provide an improved method for selectively pumping any of a plurality of producing formations penetrated by one well casing.

Yet another object of this invention is to provide an improved ram jet apparatus for use in combination with apparatuses of this invention.

Other objects and advantages of the methods and apparatuses of this invention will be apparent to those skilled in the art.

Generally, according to this invention there are provided method and apparatuses for pumping liquids at high pressure and power outputs with minimum of total moving parts and a minimum of components—only two valves per cylinder in one embodiment—exposed to abrasive fluid action. Pumping units according to this invention may be built in units capable of very great pressure and power outputs with thermal efficiencies equal or greater than diesel units of the same power output. Further, the operation of of the method and apparatuses of this invention are flexible to meet the demands thereon during variations of load as well as in starting. The method and apparatuses herein are particularly well adapted to handling abrasive liquids as met in underground fluids. Variations of the method and apparatuses included within the scope of this invention are particularly adaptable to where high pressure and power outputs are needed and limited space is available, as in downwell pumps.

This invention comprises novel functions and cooperations thereof as well as novel combinations and structures of parts as will more fully appear on the course of the following description, of which description the drawings attached hereto form a part.

In the drawings wherein like reference characters designate like parts in the several figures.

FIGURE 1 is a diagrammatic representation of conditions in an assembly made according to this invention during the initial part of the period during which intake and upward movement of liquid occur in the combustion chamber and air intake occurs in the air compression chamber;

FIGURE 2 is a diagrammatic representation of conditions in the assembly shown in FIGURE 1 during the period following upward motion of liquid in the combustion chamber, and during which period compressed air and fuel are injected into the combustion chamber;

Figure 5:
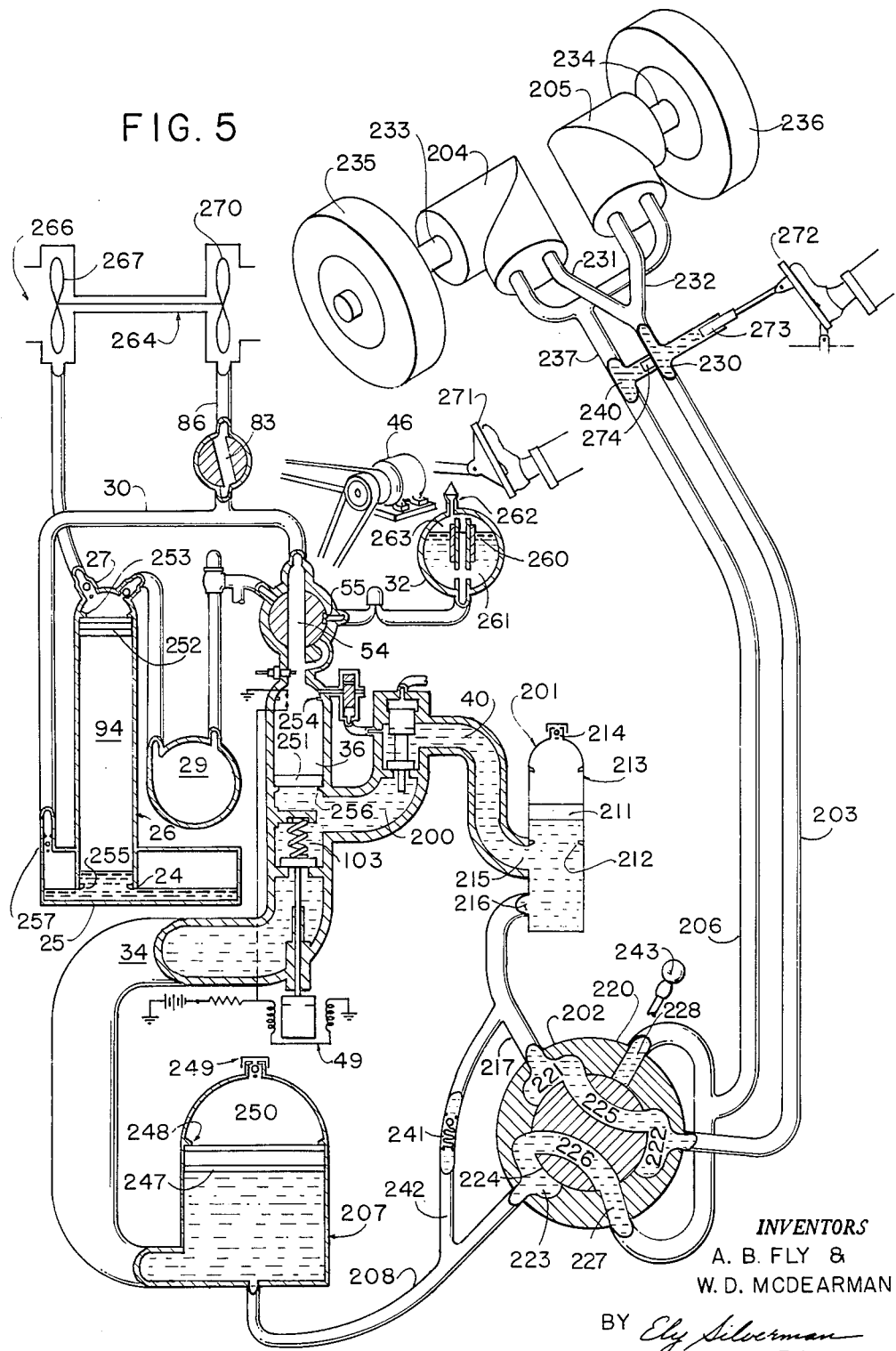

FIGURE 5 is a diagrammatic showing of the conditions in an assembly during the period of exhaust to the atmosphere from combustion and compression cylinders, such assembly comprising the same components as shown in FIGURE 1 and, also, including a supercharger system, a mechanical drive unit permitting the entire assembly to be self-propelled, and modifications providing that the pump unit shown in FIGURE 1 may be operated in the inverted position.

Figure 3:
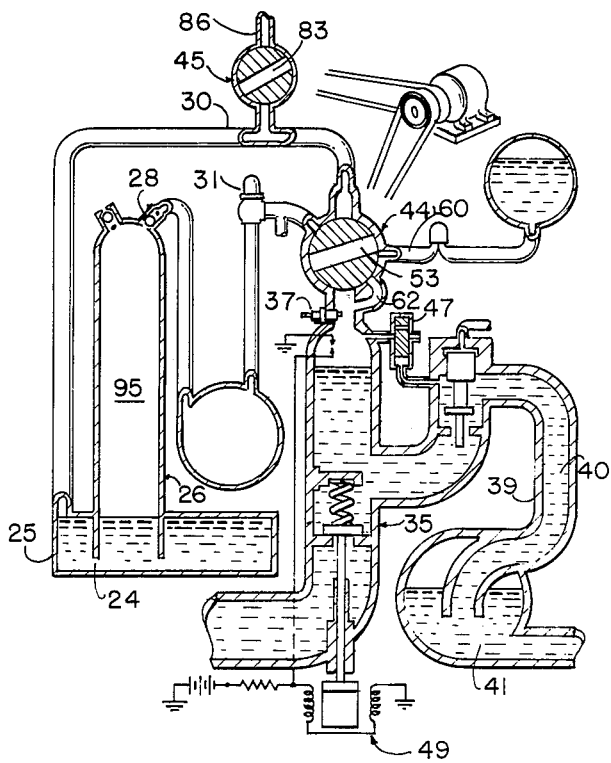
FIGURE 3 is a diagrammatic showing of the conditions in the assembly of FIGURE 1 during the initial part of the power stroke and downward motion of the liquid in the combustion chamber.
Figure 4:
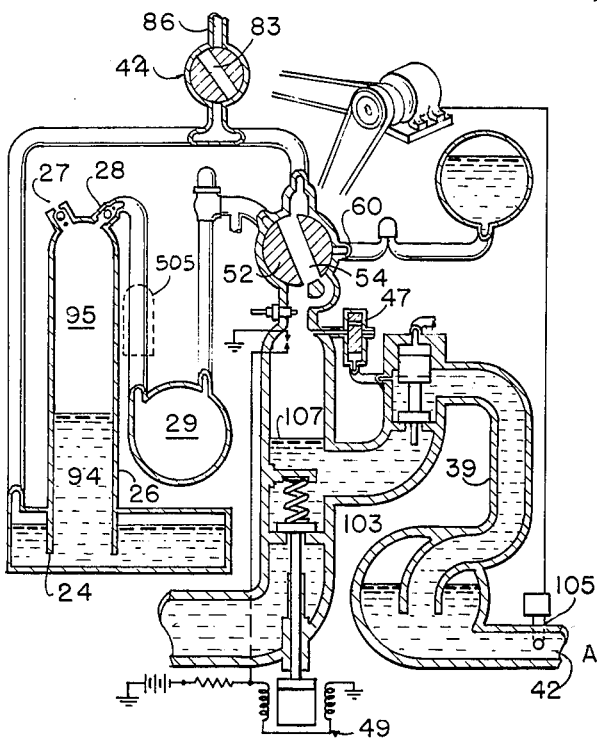
FIGURE 4 is a diagrammatic showing of conditions in the assembly of FIGURE 1 during the initial portion of the period of charging of the air compression cylinder by exhaust gases discharged from the combustion chamber.
Figure 6:
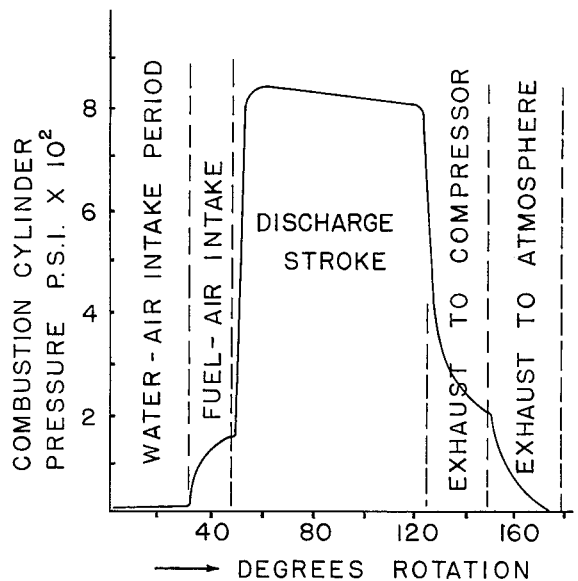
Figure 7:
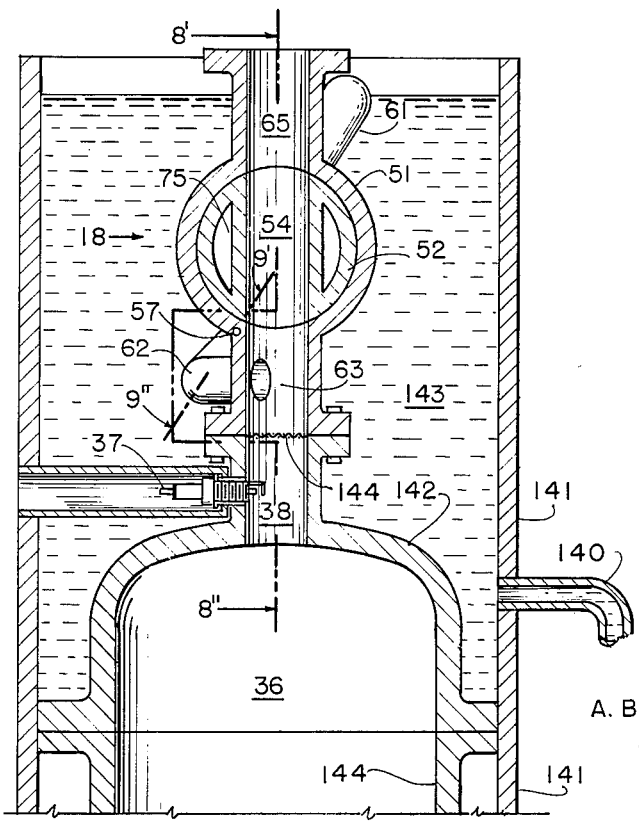
Figure 8:
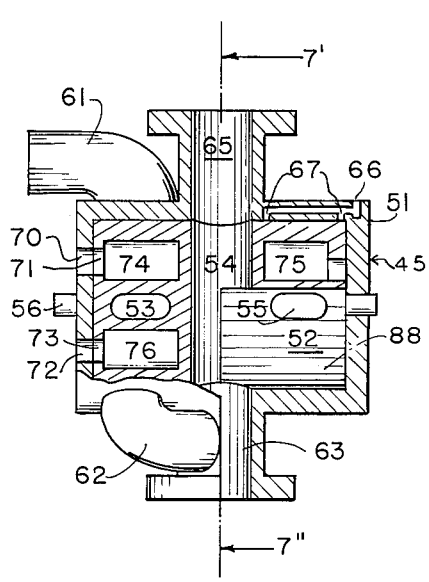
Figure 9:
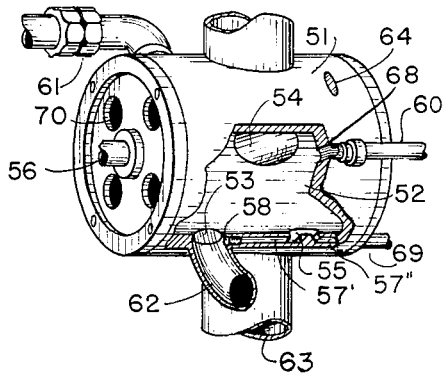
Figure 10:
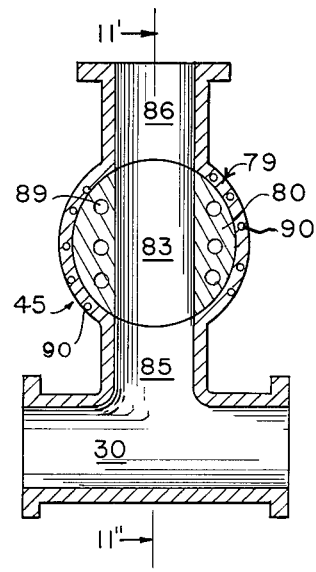
Figure 11:
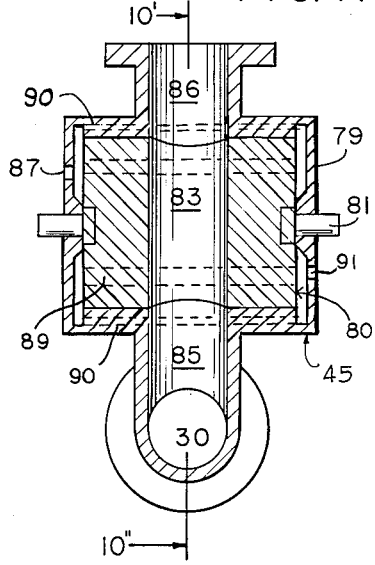
Figure 12:
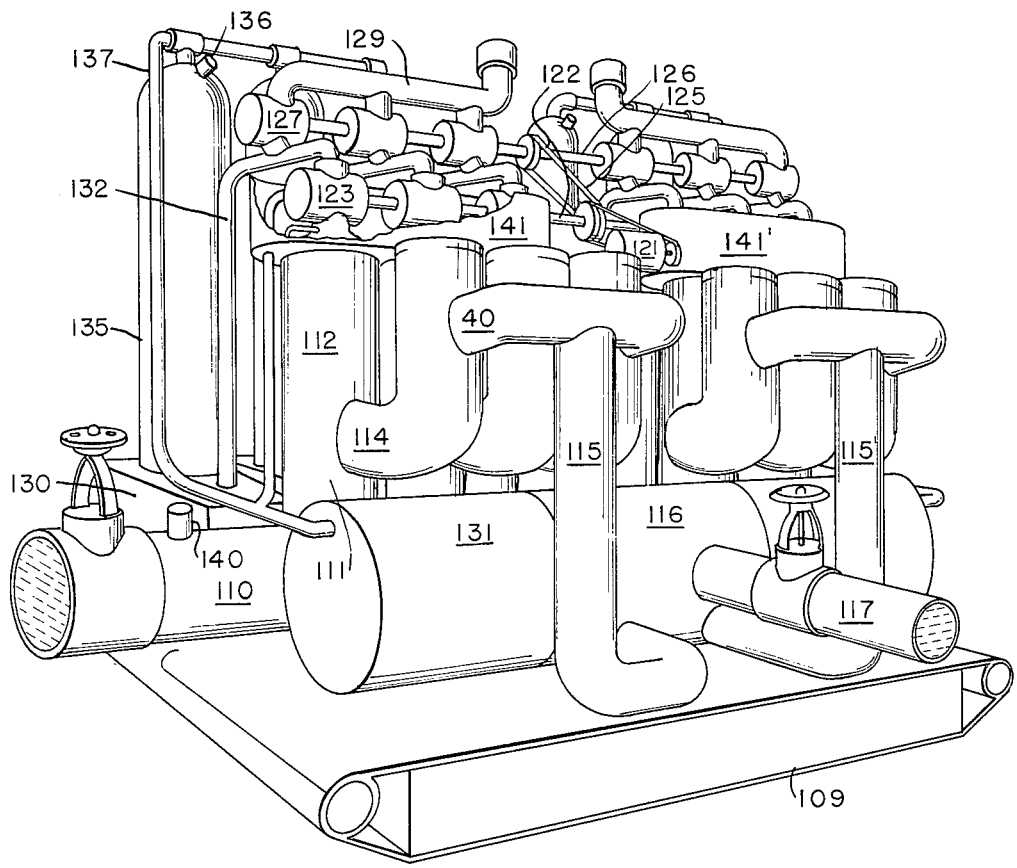
Figure 13:
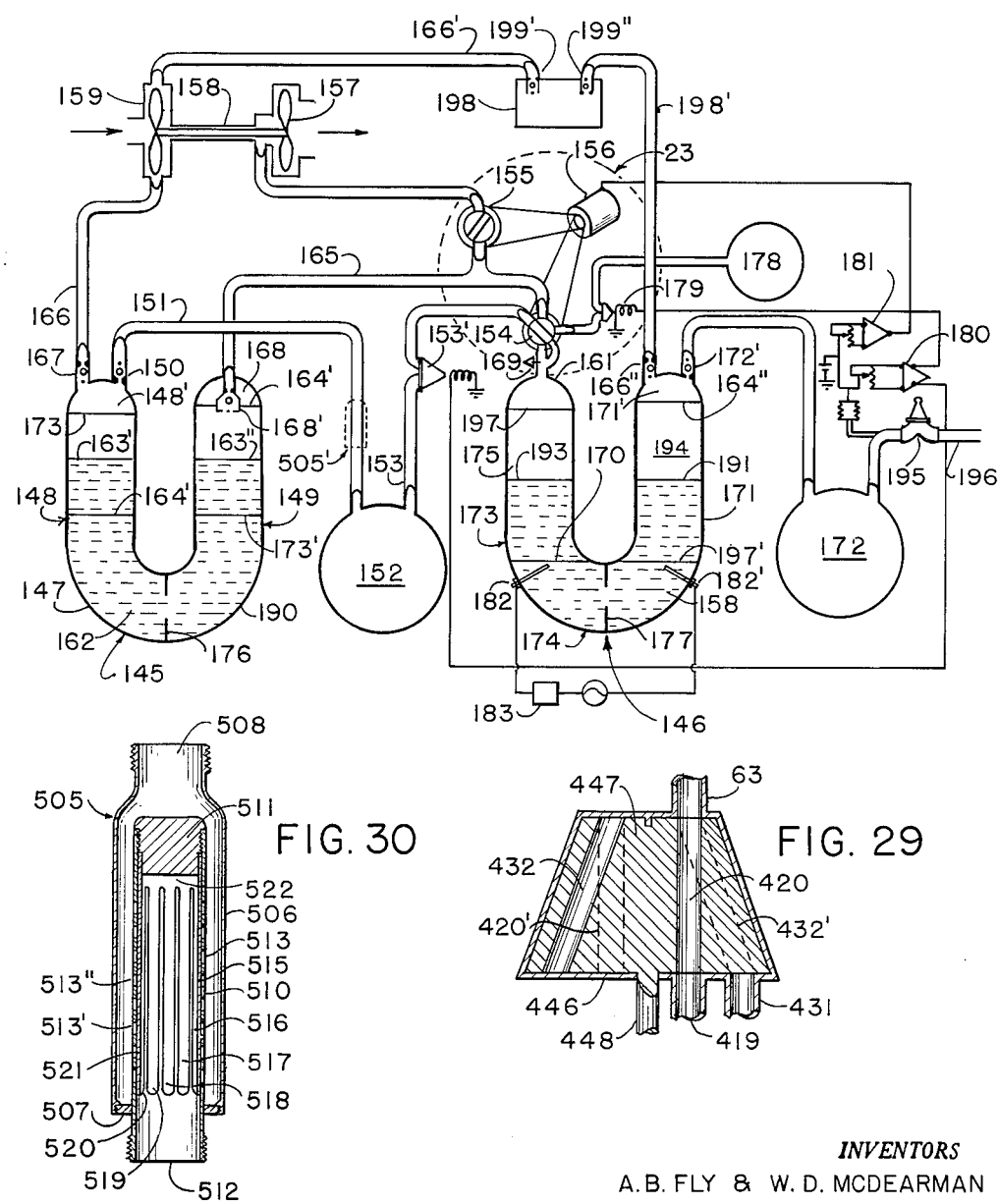

FIGURE 6 graphically illustrates the pressure-time relationships in the combustion chamber of the pump assembly of FIGURES 1 through 5;

FIGURE 7 is a central transverse cross-sectional view of the rotary injection valve and a longitudinal cross-sectional view of the combustion cylinder head and chamber of this invention as seen along a plane normal to the axis of rotation of the body of said valve, said plane being indicated by the line between arrows 7'–7" in FIGURE 8, the direction of this view being given by the direction of the arrows 7' and 7";

FIGURE 8 is a view of the body and housing of the rotary injection valve, partly in longitudinal cross-section along line 8'–8" of FIGURE 7 and partly broken away, as seen along arrow 18;

FIGURE 9 is a perspective view of the rotary injection valve and housing, partly broken away and showing the section seen along plane 9'–9" of FIGURE 7;

FIGURE 10 is a central transverse cross-sectional view of the exhaust valve, along the plane indicated by line 10'–10" of FIGURE 11;

FIGURE 11 is a central longitudinal cross-section view of the exhaust valve, taken along the plane indicated by line 11'–11" of FIGURE 10;

FIGURE 12 is an over-all perspective view, partly broken away, of a preferred embodiment of a pumping apparatus according to FIGURE 1 of this invention;

FIGURE 13 diagrammatically shows in sectional view an alternative embodiment of the pump assembly of this invention;

FIGURE 14 is a diagrammatic longitudinal cross-section representation of an assembly comprising the same air compressor and valve sub-assemblies as in FIGURES 1 through 11 and, also, including modifications of the pump sub-assembly 22 for use of this assembly as a downwell pumping unit, said assembly being shown in the combustion chamber condition and timing and valve sub-assembly position corresponding to FIGURE 1;

FIGURE 15 is a diagrammatic longitudinal cross-section representation of components of the assembly of FIGURE 14 in the combustion chamber condition and valve assembly position corresponding to FIGURE 3;

FIGURE 16 is a diagrammatic longitudinal cross-section representation of components of the assembly of FIG- URE 14 in the combustion chamber condition and valve assembly position corresponding to FIGURE 4;

FIGURE 17 is a diagrammatic longitudinal cross-section representation of components of the assembly of FIGURE 14 in the combustion chamber condition and valve assembly position corresponding to FIGURE 5;

FIGURE 18 is a diagrammatic longitudinal cross-section representation of an assembly adapted for very deep well pumping, said assembly comprising the same air compressor and valve subassemblies as shown in FIGURES 1 through 11 and, also, inclding modification of the pump sub-assembly 22 for use of this assembly as a pumping unit for extremely deep wells, said assembly being shown in the combustion chamber condition and timing and valve sub-assembly position corresponding to that shown in FIGURES 3 and 15;

FIGURE 19 is a diagrammatic longitudinal cross-sectional representation of components of the assembly of FIGURE 18 in the combustion chamber condition and valve and timing assembly position shown in FIGURES 1 and 14;

FIGURE 20 is a diagrammatic longitudinal cross-sectional representation of an assembly comprising the same air compressor and valve sub-assemblies as in FIGURES 1 through 11 and, also, including modification of the pump sub-assembly for use of this assembly for fracturing downwell formations, said assembly being shown in the combustion chamber condition and timing and valve sub-assembly postion corresponding to FIGURE 3;

FIGURE 21 is a representation of components of the assembly of FIGURE 20 in the combustion chamber condition and valve and timing sub-assembly position shown in FIGURE 5;

FIGURE 22 illustrates a modification of the device of FIGURE 20;

FIGURE 23 is a diagrammatic longitudinal cross-section representation of an assembly comprising the same air compressor and valve sub-assemblies in FIGURES 1–11 and, also including modification of the pump sub-assembly for use of this assembly to selectively pump one—in this case the lower of two—of a plurality of liquid producing zones penetrated by one well casing, said assembly being shown in the combustion chamber condition and timing and valve assembly position corresponding to FIGURE 3 for the lower of said zones;

FIGURE 24 is a diagrammatic longitudinal cross-section representation of components of the device of FIGURE 23 during pumping of the lower liquid zone and in the combustion chamber condition and valve and timing sub-assembly position corresponding to FIGURE 1;

FIGURE 25 is a diagrammatic longitudinal cross-section representation of the assembly of FIGURE 23 during pumping of the upper liquid zone, the combustion chamber condition and valve and timing sub-assembly position corresponding to FIGURE 3 above-described;

FIGURE 26 is a diagrammatic longitudinal cross-section representation of components of the device of FIGURE 23 during pumping of the upper liquid producing zone and in the combustion chamber condition and valve and timing sub-assembly position corresponding to FIGURE 1;

FIGURE 27 is an overall view of a ram jet assembly to be used with apparatus herein disclosed;

FIGURE 28 is an enlarged diagrammatic longitudinal cross-sectional view of some portions of the device of FIGURE 27;

FIGURE 29 is an enlarged diagrammatic longitudinal cross-sectional view of the dual completion valve 421 used in the assembly of FIGURES 23 through 26; and FIGURE 30 is an enlarged view of a reed valve to be used in the air compressor sub-assemblies of this invention.

The major functional sub-assemblies of the pump unit of FIGURES 1–12 according to this invention comprise comprise the air compressor sub-assembly shown in the dotted area 21 of FIGURE 1, the pump sub-assembly shown in the dotted area 22 of FIGURE 1, and the timing and valve sub-assembly as shown in dotted area 23 of FIGURE 1.

The air compressor sub-assembly 21 comprises a fluid reservoir chamber 25, compressor cylinder 26, inlet check valve 27 and outlet check valve 28 therefor, air supply tank 29, and an exhaust gas line 30. Fluid reservoir chamber 25 is a closed container. It contains a liquid—as water—therein; upwardly extending from said chamber and the liquid therein is the air compressor cylinder chamber 26; the interior of chamber 25 and cylinder 26 communicate through the bottom portions thereof only, below the lower projecting portion of wall 24 of cylinder chamber 26, as shown. The air compressor cylinder chamber 26 has at its top an inlet check valve, 27, and an outlet check valve 28. The outlet of valve 28 operatively connects and discharges into air supply tank 29. The top of chamber 25 is provided with an exhaust gas line 30 which connects the interior of chamber 25 to the exhaust valve and rotary injection valve, as hereinbelow described.

The pump engine sub-assembly 22 comprises a fluid suction pump 33, a fluid suction inlet line 34, a suction valve 35, combustion cylinder 36, cylinder inlet 38, discharge valve 39, discharge manifiold 40, discharge surge tank 41, and a discharge line 42. Fluid suction pump 33 is positioned in the fluid suction inlet line 34; one-way inlet or suction valve 35 is located in that line adjacent to and supplied fluid into combustion cylinder 36. At the top of the cylinder 36 is cylinder inlet 38; combustion chamber discharge valve 39 is provided with a valve which is open during a pressure difference thereacross causing a flow of fluid therepast outwardly and automatically closes when such pressure differential ceases; this valve opens to discharge manifold 40 which in turn connects to a discharge surge tank, 41, which supplies the high pressure discharge line 42.

The timing and valve sub-assembly 23 comprises, an ignition system, 43, a rotary injection valve, 44, a rotary exhaust valve, 45, a variable speed control motor 46, equalization piston 48 and bleed off 47, a suction valve control system 49, and a discharge valve control 50.

The ignition system is a conventional coil ignition system provided with a spark plug 37 attached to the combustion cylinder inlet 38. The rotary injection valve 44 is attached to the top of the combustion cylinder and is provided with openings for passage of gaseous mixtures into said cylinder, and for passage of gases from said cylinder to the rotary exhaust valve 45. The rotary exhaust valve is operatively connneced to the rotary injection valve and to the exhaust line 30 of and to the atmosphere or, as described below, to a supercharging system. A variable speed control motor 46 drives the rotary injection valve and the exhaust valve and the ignition system to provide for the rotation of said valves as below described and for an electrical discharge across the spark plug 37 when the rotary injection valve body presents to combustion cylinder inlet 38 a solid surface and thereby closes off exits from the top of said combustion cylinder prior to igniting of the fuel-air mixture in the combustion cylinder.

The rotary injection valve comprises a housing 51 with a valve body 52 therein. The rotary injection valve housing is provided with a cylindrical cavity 88 therein for a valve body 52; the valve body is generally cylindrical in outline and rotatably fits in said cavity; the body has several passages and chambers therein; it has a diametral air passage 53 with its length transverse to the longitudinal axis of the valve body; the passage is rectangular in cross section—with rounded edges however—and its cross section is longer in the direction of said longitudinal axis than in the direction transverse thereto.

This passage connects housing air inlet 61 and fuel air injection line 62 of the housing when said valve body is oriented as shown in FIGURE 2, discussed below. Spaced longitudinally along said longitudinal axis of said cylindrical valve body a distance from the central longitudinal axis of the passage 53 is an exhaust passage 54 in said valve body; this passage is cylindrical in cross section and matches the inlet and outlet passages 63 and 65 of the valve housing, below described; cylindrical passage 54 has a central longitudinal axis which is diametral with respect to the cylindrical valve body 52; passage 53 and 54 are sufficiently spaced to avoid any contact between the walls thereof.

The longitudinal axis of passages 53 and 54 are at an angle to each other to provide for the sequence of connections below described for the cycle of operation shown in FIGURES 1–5, below described.

A fuel recess is provided in the valve body 52; this recess has an opening to the surface of said body.

The housing 51 for the rotary injection valve has an exterior opening for air inlet passage 61 on the top of said housing and an interior opening to the cavity 88 within said housing; fuel-air injection line 62 has an opening in said cylindrical housing cavity: these openings in the housing cavity are connected through passage 53 of the valve body only when such body is in the position below described for FIGURE 2. Neck 63 of the housing has one orifice which opens to the cylindrical cavity 88 in the valve housing, another orifice whereat line 62 opens thereinto, and another orifice connected to the combustion chamber inlet 38. A passage 65 provides, with passage 54 oriented as shown in FIGURE 8, for movement of exhaust gases to the exhaust valve 45 from the combustion chamber via neck 63 of the housing. The housing lubricant outlets open to the housing cavity 88 and open to the exterior of the housing, as inlet 66, and the lubricant is distributed by passages in the housing, as 67, to the surface of the valve body 52.

Fuel line 60 enters passage 68 in the housing and carries fuel therethrough to the fuel chamber 55 in the valve body. The housing is provided with a fuel transport passage 57' at one end of which is located orifice plate 58, and the other end of said passage opens to the cavity 88 in said housing; a passage 57" passes from an adjacent opening in said cavity to the exterior of said housing wherein is located fuel-air line 69. Recess 55 is placed in the valve body so that the opening thereof on the surface of the valve body covers the openings into cavity 88 of passages 57' and 57". Accordingly when the fuel chamber 55 provides for connection of passages 57' and 57" air fed from fuel-air line 69 into fuel transport passage 57' flows into chamber 55, mixes with the fuel therein—either gaseous or liquid—forming a mixture therewith which is carried through passage 57" to orifice 58 and there that fuel-air mixture is sprayed into the fuel-air injection line 62.

The valve body is held in the housing by end plates on the housing and shaft 56 serves to turn the valve body in the cavity 88 in timed relation with exhaust valve 45 and ignition system 43, all driven by motor 46 at such speed as is desired, e.g., about 50 r.p.m.

Valve housing 51 is provided with a coolant inlet 70 matching coolant inlet 71 of the valve body. The housing further is provided with a coolant outlet 72 corresponding with the coolant outlet 73 of the valve body. The valve body coolant inlet connects to the coolant inlet chamber 74 which in turn connects to the central chambers 75 on the other side of the valve body and coolant outlet chamber 76. The drive shaft 56 provides for movement and control of the position of the valve body relative to the housing.

Exhaust valve housing 79 is provided with a cylindrical cavity wherein cylindrical exhaust valve body 80 rotatably yet firmly fits.

The exhaust valve 45 comprises a housing 79 and a valve body 80. A drive shaft 81 on the body provides for control of the position of said body. The body has an exhaust passage 83 which connects to the exhaust line 30 by neck 85 and exhaust discharge 86. Coolant inlet 87 of housing 79 provides coolant to the exhaust valve body coolant passages 89, and hence to the exhaust valve housing passages 90 to exhaust valve housing outlet 91. Passage of coolant through these passages helps maintain the temperature and dimensional stability of these valves and preserves the tolerances necessary for close sealing fit and proper operation of the assembly.

The conditions occurring in the pumping, compressor, and valve sub-assemblies during each of the two strokes which form one cycle of operation are illustrated in FIGURES 1 through 5. Generally, during each cycle of a pump unit, according to this invention, the fluid to be pumped is introduced by the suction line pump 33 to the suction valve 35 filling the combustion cylinder 36, is discharged under the influence of combustion in the combustion cylinder through the discharge valve 39, and flows through the manifold 40 into the surge tank 41 and out through the common discharge line 42.

FIGURE 1 illustrates a point in the operational cycle which may be regarded as the beginning of such cycle for purposes of description. At the point illustrated in FIGURE 1, the rotary injection valve body is positioned so that the exhaust passage 54 therethrough provides for free movement of combustion gases from the combustion cylinder to the exhaust valve 45 where passage 83 is then in its full open position. Concurrently, exhaust gasses pass from the fluid reservoir box 25 through the exhaust gas line 30 to and through the exhaust valve 45 and passage 83. These gasses were initially exhausted from the compression and combustion cylinders by the pressure therein, which pressures were those applied by the weight of fluid 94 in the compression cylinder and the pressure of gas, 95, thereabove in cylinder 26, as shown in FIGURE 5, as well as the pressure—equal to discharge line back pressure—existing in combustion cylinder 36. At the moment shown in FIGURE 1, the expelling force is only the pressure of suction pump 33 in cylinder 36 and the difference in height between the level of the column of liquid, 94, in the compressor cylinder and the level of such fluid in the fluid reservoir box 25. At the moment shown in FIGURE 1, fresh air enters the compressor cylinder through inlet check valve 27 while back pressure in the air supply tank 29, which pressure is predetermined by the setting on pressure regulator 31, holds the outlet check valve 28 closed, while fluid enters the combustion cylinder through suction valve 35 which has been opened by the positive pressure provided by the solenoid 97 operating against spring 103, as shown in FIGURE 1. During the moment illustrated in FIGURE 1, the water level is rising in the combustion cylinder as shown by the arrows at the fluid level 94, and falling in the compression cylinder. The suction valve 35 is held in the open position against spring 103 by the suction valve control system 49: this system comprises solenoid 97 and a solenoid circuit, 98; this circuit compriess a series connected E.M.F. source 99, resistor 100, and a fixed astatic gap 101, connected to the circuit so as to short out the solenoid when fluid in the compression cylinder rises to a desired level, 102, in the cylinder. Thereupon the solenoid is deenergized and the spring 103 closes the suction valve against the suction line pressure. The astatic gap switch provides a control of fluid level to within plus or minus 1/32 inch.

The rotary injection valve and exhaust valve rotate continuously under the energization of the variable D.C. timing motor 46. Accordingly, the rotary injection valve is rotated past the position shown in FIGURE 1 to the position shown in FIGURE 2. In this position exhaust passage 54 is closed off from passages 63 and 65 in housing of the rotary injection valve. At this time the air injection passage 53 in the valve body 52 is brought in line with the passages 61 and 62 therefor in housing 51. Thereupon, as shown in FIGURE 2, air from the supply tank 29 (at 100 to 200 p.s.i.g. in the embodiment below described in detail) passes, serially, through the pressure regulator 31—set to close at from 100 to 200 p.s.i.g.—air line 61, valve body air inlet passage 53, valve housing passage 62, and hence, into the inlet 38 and interior of the combustion cylinder 36. Concurrently air passes from line 69 to mix with the fuel theretofore held in the fuel chamber 55 and as shown in FIGURE 9 carry the thus-formed mixture through the fuel transport passage 57' to the orifice plate 58 and there form a spray of said mixture into the stream of air passing through the passage 62.

The fuel-air mixture so made swirls into the combustion cylinder from the air inlet line 62 past the points of spark plug 37 and, therefrom, into the combustion chamber. This flow of fuel-air mixture serves to remove any moisture which may have gathered on the points of the spark plug and forms a compressed air-fuel mixture in cylinder 36. At this point in the operational cycle shown in FIGURE 2 the level of water in the compressor cylinder has reached the level in the fluid reservoir box 25.

As shown in FIGURE 3, continued rotation of the rotary injection valve body, via its drive shaft 56, closes off the air inlet passage 53 from the feed and outlet passages therefor in the rotary injection valve body housing 51 and also closes off fuel-air line (69) passage from its connection with the interior of the combustion chamber. The rotary injection valve housing is provided with a breather slot 64 whereby to bleed off to the atmosphere the air under pressure trapped in the fuel chamber 55 prior to refilling said chamber by the fuel supply.

The ignition system 43 is a part of the timing and valve assembly and is, as in conventional systems, through condensers, capacitators, and breaking points, timed to deliver a high tension spark to spark plug 37 after the above-described closing off of the air passage 53 and the fuel air line 69 from the combustion chamber. The spark initiates combustion in the combustion chamber, then filled with the compressed fuel-air mixture previously added. Pressures needed to pump the liquid—over 800 pounds per square inch in the embodiment below described—are thereby developed in the combustion chamber and the fluid in the combustion cylinder passes out through the discharge valve 39 and, thence, into the discharge manifold 40 and the surge tank 41. The discharge of fluid from the combustion chamber continues until the combustion chamber pressure no longer exceeds the discharge pressure and the fluid momentum is dissipated, whereupon the discharge valve is closed, as shown in FIGURE 4.

As shown in FIGURE 4, the continued rotation of the valves 44 and 45 by the timing motor brings the exhaust passage 54 of the rotary injection valve body to connect the interior of the combustion chamber with the exhaust opening 65 and line 30, while the rotary exhaust valve is still in the closed position. Accordingly, the exhaust gases from the combustion cylinder, under approximately the same pressure as the discharge pressure in manifold, 40, expand and force liquid 94 in the reservoir box and air 95 thereabove upwardly at high pressure. The air 95 flows past the outlet check valve 28 into the air supply tank 29. Thereby the gases in the compression chamber 26 are substantially all transferred to the air supply tank 29. The rotary injection valve and rotary exhaust valves are kept open by the timing control concurrently for a sufficient period of time to bleed the compressor fluid reservoir box 26 and the combustion cylinder 36 substantially to atmospheric pressure after this transfer.

The volume of the fluid in the fluid reservoir box 25 above 24, the lower end of the compression cylinder, will not quite fill the compressor cylinder thereby preventing excessive expansion of the exhaust gases from discharging compressor fluid into the air supply tank. The amount of such liquor in the fluid reservoir box, including variations due to condensation and evaporation, is compensated for by a conventional fluid level regulating system.

Thereafter, the timing motor drives the rotary exhaust valve to the position shown in FIGURE 5 at which point exhaust valve passage 83 connects line 30 to the atmosphere and the gases under pressure in the reservoir box 25 and in the combustion chamber will exhaust to the atmosphere or to a pump, as 264 in FIGURE 5, for precompression of air passing to the compressor cylinder using the energy of these exhaust gases.

The pressure in pump cylinder 36 thus drops to atmosphere which is below the pressure in pump suction line 34. This change in pressure permits the energizing solenoid 97 on the suction valve control system to overcome the action of suction valve spring 103 and opens the suction valve 35. Thereupon fluid enters the combustion cylinder 36.

When the pressure in the compressor reservoir box 25 drops to atmosphere or below the amount required to close the inlet check valve 27 the level of the fluid column 94 within compressor cylinder 26 drops, taking in fresh air through the inlet check valve 27.

Following this, the movement of the valves 44 and 45 effects the conditions and operations above-described for FIGURE 1, thereby completing the cycle of operation on each 180° of rotation of the exhaust and injection valve bodies.

The pressure-time relationships of FIGURE 6 indicate the relative times of the various portions of the above-described cycle and the pressure in the combustion cylinder 36 during such periods, in a typical operation of the method and apparatuses of this invention.

Transducer measurements of the discharge pressure in the discharge line control the speed of the D.C. motor 46, and so vary the number of revolutions per minute of the valves 44 and 45, and so maintain a constant discharge pressure in the line 42 against a varying load. Further, over-pressure safety switches in the discharge line, as at 105, stop the D.C. motor instantly to provide a high degree of operational safety.

During starting discharge line pressure would be negligible under most operating conditions. Injection of a compressed fuel-air charge into the combustion cylinder 36 would then discharge fluid from that cylinder prematurely. Therefore, an equalization system is provided to hold the discharge valve 39 closed during fuel-air charge injection until the line pressure exceeds air injection pressures. Accordingly, regulated air pressure forces the rod on equalization piston 48 in discharge valve chamber against the discharge valve 39 and holds that valve shut until ignition occurs. When the discharge line pressure exceeds the regulated air pressure on top of the equalization piston then the discharge fluid pressure forces the equalization piston upward allowing the discharge valve to then function in the usual manner above-described. A manual disconnect, as 106, of this equalization system is actuated after such usual manner of operation has begun.

Additionally, a bleed-off valve assembly 47, comprising a bleed chamber, a bleed piston, and connection of said chamber to the discharge line, is provided to limit the combustion chamber pressure to a lower level during starting and so prevent the discharge of exhaust gases into the surge tank. When discharge pressure builds up, this valve will be forced upward closing off the bleed port in the bleed piston. Also, in the event of a sudden loss of discharge line pressure the bleed-off valve will again open to prevent over expansion of the exhaust gases in the combustion cylinder and the discharge thereby of exhaust gases into the discharge surge tank.

Starting is accomplished in the embodiment below described by use of a hand pump to charge the air reservoir 29 to 200 pounds p.s.i.g. The combustion chamber pressure in such embodiment is limited by the bleed-off valve as above described until the fluid output pressure equals 450 p.s.i., and the fluid discharge valves are controlled by equalization pistons as above described until the output pressure equals the air intake pressure.

A six cylinder pump made according to this invention is shown in FIGURE 12. This machine is shown as mounted on skids 109 for handling, moving, and mounting. Fluid enters through suction line 110, flows through suction valves located as at 111 into combustion cylinders as at 112. Under the influence of combustion in said cylinder, said liquor flows to the discharge valve as 114, discharge manifold 115, and into a surge tank, as 116. All six cylinders discharge into one surge tank and out through a common discharge 117. Each cylinder is a part of a pump unit comprising the pumping, timing, and compressor sub-assemblies as above described for FIGURES 1 through 5. All six rotary injection valves and all six rotary exhaust valves are rotated by a common variable-speed D.C. electric motor 121. Motor chain belt 125 from motor 121 drives sprocket-teeth on the drive shaft 126 and 122 whereby timing thereof is co-ordinated with such valve bodies as above-described and with the electrical spark mechanism and spark plug, as 43, in the manner above described for FIGURES 1 through 5.

A drive shaft 122 operates the rotary injection valves 123 and drive shaft 126 controls the exhaust valves as 127 An exhaust line, as 129, provides for exhaust. The fluid reservoir box 130 is connected to air supply tank 131 which is in turn connected to the rotary injection valve. Exhaust gas line 132 connects to the rotary exhaust valve 127 and injection valve 123 in the manner above diagrammatically illustrated in FIGURES 1 through 5. The air compressor 135 is provided with an inlet check valve 136 and the outlet check valve 137.

A particular example of operation of the above-described embodiment according to this invention produces an output of 800 gallons per minute at 800 p.s.i.g. or 375 hydraulic horse power. The fuel used in such an apparatus is commerical propane with a heat value of, for example, 19,994 British thermal units per pound at a specific weight of 4.24 pounds per gallon at 68° F. and 123 p.s.i. About 160 pounds of such fuel are used per hour for the total six cylinder engine. The vapor pressure of such fuel material would be 124 p.s.i. at 70° F., 167 p.s.i. at 90° F., 192 p.s.i. at 100° F. Such fuel has an ignition temperature of 920° F. to 1020° F., and between 4.2% and 4.5% of such gas in the air gives flame temperature of over 3600° F. The actual thermal efficiency of such apparatus is about 35%. The fuel rate per pulse is .00444 pound per pulse or a total of 159.8 pounds per hour. The air weight per pulse is .0686 pound per pulse or a total of 2,470 pounds per hour. The theoretical horse power is thus 1,113.7 H.P. and provides an estimated thermal efficiency of 35.9%. The approximate gross weight of the pump unit is 3,500 pounds and the approximate gross weight of the compressor is 3,000 pounds. The optimum valve speed is 50 r.p.m. and is, of course, adjustable to rotate at 5 r.p.m. or as high as 100; this 50 r.p.m value speed provides 100 cycles per minute. Venting the exhaust gases from the rotary exhaust valves through a turbine section of a supercharger, forcing air from the compressor section of the supercharger through the inlet check valve of the compressor cylinder, as described for embodiments of FIGS. 5 and 13, results in efficiencies exceeding those of conventional diesel engines.

The compressor cylinder in such embodiment has an internal diameter of about 7⅝ inches (45.66 square inches cross-section) and a stroke of about 7¼ inches for a total displacement of 1991 cubic inches and a compression ratio of 11.1.

The valve body on exhaust and on rotary injection valves is made of stainless steel (440C) hardened and finely machined to plus or minus 1⁄10,000 inch after the machine and grinding work thereon had been done. Such valve bodies have thermal co-efficient of expansion slightly less than that of the mild steel valve housing. Full pressure lubrication is obtained with molybdenum disulfide emulsified in a silicon-phosphate vehicle.

The rotary injection valve body used in the above described embodiment is cylindrical; it has a diameter of 4 inches and a length of 6 inches. Transverse to the longitudinal axis of said cylinder fairly in the center of said valve is located the axis of the exhaust passage 54, said exhaust passage having a diameter, in the above embodiment, of 1½ inches, which corresponds to the internal diameter of the exhaust line 65.

The air inlet passage 53 is rectangularly slot-shaped, as shown in FIGURE 7, to provide a long path for the spray of fuel from passage 57 and to shorten the time required for the injection of the fuel-air charge. The longitudinal axis of passage 53 is parallel to the plane of the exhaust passage through the rotary injection valve and also in a plane normal to the longitudinal axis of that valve body. The central longitudinal axis of this air inlet passage is at 90 degrees to the central longitudinal axis to the exhaust passage in that valve body. The rotary injection valve housing 51 provides ports for such air inlet passage at 30 degrees to the exhaust passage axis as shown generally in FIGURES 8 and 9, whereby the time relationships above described are effected. The fuel chamber 55 has a sufficient volume (about 0.25 cubic inch in the preferred embodiment) to provide the amount of energy needed per unit stroke.

Water cooling is effected through the inlet ports 70 in the rotary injection valve body through the coolant inlet chamber 74 on the left of FIGURE 8 and around the exhaust passage 54 to central coolant chamber 75 and then again past the air inlet passage and to coolant outlet chamber 76 and a coolant outlet 72. The exhaust valve is similarly cooled. A water jacket 141 is provided for the combustion chamber housing 142 and rotary injection valve housing 51. It should be noted that, notwithstanding the pressure of about 800 p.s.i. developed in the combustion chamber, and the high instantaneous ignition flame temperatures, as shown in FIGURE 3, said total force bearing on the valve body is borne by the rotary injection valve over an area substantially larger than that to which the 800 p.s.i. existing in the combustion chamber is applied. Accordingly, in combination with temperature control, close machining and high pressure lubrication, entirely adequate sealing against loss of pressure gases is effected.

According to this invention high fluid pressures can be developed to overcome the starting loads imposed upon the hydraulic motor. As torque requirements to move the load increases pump displacement according to the device of this invention may be increased, using higher r.p.m. of the hydraulic motor.

Pressure produced by the method and apparatus of this invention can presently be readily furnished up to 2,000 pounds per square inch. Increase of the pressure with which the fuel supply is passed to the fixed volume fuel chamber 55 or increase of the size of said chamber on the rotary injection valve provides for a greater weight of fluid moved per each revolution of the rotary injection valve body. Also, the variable speed D.C. motor may increase the rate of rotation of the exhaust and injection valves. Accordingly, a great variation in the output energy of the machine is achieved by increasing either fuel-air injection pressure or weight of fuel combusted or increasing rate of constant composition air-fuel mixture consumption by increased r.p.m. of the valves. It will also be noted that in the device of this invention moving parts are reduced to a minimum. Also, bringing the fluid pistons to the same level in the engine cylinder on each cycle and injecting the fuel-air charge under predetermined regulated pressure allows the injection of the same quantity of fuel and air in each cycle regardless of the speed of operation. Cams are not needed and the only wearing surfaces are in valves 45, 44, 35, and 39.

The device of FIGURE 12 is only seven (7) feet long, 66 inches wide and 66 inches high, and has the characteristics given in Table I hereinbelow.

In FIGURE 12, the water jacket 141 for the three cylinders discharging into manifold 115 is shown partly broken away to illustrate some of the interior relations thereof; corresponding jacket 141' for the other three cylinders discharging into manifold 115' is shown in its usual position. Cooling line 140 feeds fluid—as water—into jacket 141 to cool the cylinder head 142, as by water 143 in said jacket and cools the lower cylinder walls 144 by flowing through the cooling chamber between jacket 141 and said wall. By such cooling the dimensional and structural characteristics of the valve and combustion cylinder are maintained notwithstanding the use of the elevated flame temperatures concomitant on the ignition of combustible fuel-air mixtures as above described injected into a combustion cylinder at pressures of 200 p.s.i.g. and upward. The known advantage of high temperature and high thermal and economic efficiency concomitant on use of such high combustion temperatures are readily permitted by the use of an injection valve as 44, as above described, which permits high pressures to be used in the combustion chamber safely and efficiently, without the wear and fatigue problems concomitant on use of reciprocating valves. Valve 44 provides a large bearing surface to withstand those forces which the valve surface open to the combustion chamber during combustion must withstand under high temperatures provided by use of igniting high pressure fuel-air mixtures. A 20 mesh tungsten screen, 144, is provided in the flange at neck 38 to protect the valve face and other structures otherwise directly exposed to the combustion reaction.

It will be noted that the device of this invention is able to tolerate suspended abrasives, and avoids high rotational speeds and use of packing glands and wear rings by direct conversion of the heat energy of fuel directly into hydraulic energy. A 375 hydraulic horse power pump unit made according to this invention described above and shown in FIGURE 12 replaces a skid mounted oil field mud pump unit and its power plant which will displace 800 gallons per minute at 800 pounds per square inch. A comparison of these two units is made in the following Table I.

*Table I*

| Pump Unit | 600 BHP Engines 7¾" x 16" Pump | 6 Cylinder 375 HHP Pump of this invention |
| --- | --- | --- |
| Displacement: | | |
| G.p.m | 800 | 800 |
| P.s.i | 800 | 800 |
| Gross Weight, pounds | 60,000 | 7,500 |
| Overall Dimensions | 24' x 8' x 6' | 7' x 5' x 6' |
| Initial Cost | $75,000.00 | $45,000.00 |
| Estimated Monthly Maintenance | $1,000.00 | $100.00 |
| Total Moving Parts | 2,000 | 100 |

An alternative embodiment of this invention is shown in FIGURE 13, wherein the compressor and the combustion chamber operate with U-shaped chambers to take advantage of the oscillation period of the liquid in such chambers. Orifice plates are provided to more closely control the frequency characteristics of such oscillations. In this embodiment, a gas discharge is effected and a floating check piston is used rather than the astatic gap above described for control of the intake valve to the combustion cylinder.

The apparatus of FIGURE 13 is another embodiment of the process of this invention. It comprises an air compressor subassembly 145, a generally U-shaped engine subassembly 146, a turbine supercharger 158 and a valve and timing sub-assembly as 23 discussed above, all cooperating as one assembly.

The air compressor sub-assembly 145 comprises a U-shaped tank 147 with vertical upstanding cylindrical arms 148 and 149 joined by a hollow C-shaped portion 190: each arm, except as below described, is closed at its top. The C-shaped portion is filled with liquid 162, and said fluid extends, at rest, to level 163' in arm 148 and to level 163" in arm 149 when that liquid is at rest; levels 163' and 163" each extend to one-half way up the height of the vertical portion of said vertical cylinders. The top of arm 148 is closed to form a chamber 148'. The top of that chamber opens to a one-way inlet valve 167 into which inlet line 166 feeds. A one-way discharge valve 150 is also located at the top of chamber 148' and connects the interior of said chamber to compressed air discharge line 151.

The top of arm 149 is closed to form a chamber 168; line 165 connects the top of that chamber to the rotary exhaust valve 155 of the valve and timing sub-assembly 23 of this assembly. A valve 168' in chamber 168 has a floating ball which prevents passage of liquid 162 into line 165; but such does not interfere with the passage of gas to and from line 165. Chamber 148' is connected through a one-way discharge check valve 150 and line 151 to an air reservoir tank 152; air tank 152 connects and discharges through a line 153 and pressure regulator 153' (set at 200 p.s.i.g. in the preferred embodiment) to a rotary injection valve 154 of a valve assembly 23 which acts, as shown in FIGURES 7, 8, and 9, as valve 44 of assembly 23 of FIGURES 1–12 to pass air and fuel to the combustion chamber 160 below described by operations the same as those above described for the embodiment of FIGURES 1 through 12. The discharge of the exhaust valve 155 in this embodiment is connected to the turbine wheel 157 of supercharger 158 at the air intake of which is a compressor wheel 159 which supercharges the air passing to the air compressor chamber 148'. The U-shaped engine sub-assembly 146 has a right hand upright cylindrical discharge arm 171 connected to air supply tank 172, and a left hand upright cylindrical combustion chamber arm 173 connected to the rotary injection valve 154. Arms 171 and 173 are vertical right cylinders upwardly directed and closed, except as below described, at their tops and are open to and connected at their bottom by a C-shaped hollow portion 174. Fluid 158 fills the C-shaped portion and extends, at rest, to level 191 in arm 171 and to level 193 in arm 173. Levels 191 and 193 each extend one-half up the height of the vertical portion of each of said vertical cylinders. The top of chamber 173 is connected to the rotary injection valve 154 of subassembly 23 in the same manner as combustion cylinder 36 is attached to rotary injection valve 44 in FIGURES 1–12. The top of chamber 171' formed at top of closed arm 171, is connected to an inlet line 198' and line 166' from the supercharger fan 159 through a one-way inlet valve 166''; the top of the chamber 171' is also connected by one-way discharge valve 172' to air supply tank 172 which holds a reservoir of high pressure gas in the same way surge tank 41 holds high pressure fluid. One-way discharge valve 172' on top of chamber 171' provides for compression of the gas as 194 in chamber 171' above the level of the liquid 158 in arm 171, and discharge of such compressed gases only when the pressure in the reservoir 172 is exceeded by the pressure of the gas overlying the liquid 158 in the arm 171. A regulator 195 is attached to the discharge line 196 of the tank 172, and holds that pressure at about 800 p.s.i.g. in the preferred embodiment.

The portion of the chamber 173 above the liquid level 193 in closed arm 173 is referred hereinafter as combustion chamber 175; it has an inlet 161 like inlet 38 of chamber 36 hereinabove.

In the beginning of the cycle using the device of FIGURE 13, the rotary injection valve 154 (identical in structure to valve 44 above-described) moves to the position whereat communication is made between the inlet 161 of the combustion chamber 175 and the exhaust line 165 as shown in FIGURES 1, 7, and 8. At this time, also, the rotary exhaust valve 155, identical to valve 45 of FIGURES 1–12 is full open as in FIGURES 10, 11, 5, and 1 above. Air from the supercharger 158 then moves fresh air into line 166 past inlet valve 167 and into chamber 148'; thereupon fluid 162 in the air compressor tank 147 moves from the static of rest levels 163' and 163" to the levels shown as 164' and 164".

Thereafter, the rotary exhaust valve 155, driven by motor 156, closes and the rotary injection valve 154, also driven by said motor, passes to a position as shown for valves 44 and 45 in FIGURES 2 and 9 above, fuel passed to valve 154 from its storage source 178 and is admixed with air and a combustible fuel-air mixture is injected into the combustion chamber 175, as above described for valve 44.

Under the influence of the driving D.C. motor 156, the rotary injection valve 154 then closes off air line 153 and the ignition system, as 43, is activated: ignition of the spark plug thereof as 169 then occurs and causes combustion of the fuel-air mixture and increased pressure in cylinder 175 by the resultant combustion gases; the resultant expansion of those gases forces the fluid 158 in combustion chamber 175 from level 197 down to level 170 and moves fluid on the right hand arm 171 from level 197' up to the level 164". This compresses the air in chamber 171' and discharges the thus-compressed air from chamber 171' to the air-supply tank 172. The residual thus—compressed gas in chamber 171' is held at pressure of chamber 172—usually 800 p.s.i.g.—by check valves 172' and 166".

Following combustion and the discharge of compressed air to the air supply tank 172, the rotary injection valve 154 continues its rotary movement and the relationship of valve components as shown in FIGURE 4 for valves 44 and 45 is substantially achieved. Thereupon combustion gases from the chamber 175 exhaust to the air compressor chamber 168 via line 165 thereby forcing the fluid in arms 148 and 149 to levels 173 and 173', respectively, and thereby compressing the air in chamber 148' and discharging that thus compressed air via line 151 to the engine supply tank 152; this occurs by expansion of gases in chambers 171' and 175 initially approximately at the pressure of the line air-supply tank 172.

Thereafter, when the rotary injection valve moves to the exhaust position and the rotary exhaust valve 155 opens, as above described for valve assembly 23 of FIGURES 1–12, pressure in chamber 171' completes the movement of fluid 158 from level 170 to level 197 in arm 173 and the chamber 168 pressure on fluid 162 in the arm 149 of air compressor cylinder is thus released against the pressure in line 165 and that fluid then rises to the level 164". Thereby, the gases in chambers 175 and 168 are exhausted through the turbine wheel 157 preparatory to the next cycle of air intake and compression. A float valve 168' in chamber 168 prevents discharge of liquid 162 to line 165.

Air compressed by and discharged from compressor fan 159 passes to the air compressor chamber 148' above fluid 162—then at level 164'—via line 166 and, also, by line 166' and 198' into chamber 171' of arm 171 of the engine assembly 146 above fluid 158—then at level 197'. A reservoir as 198, provided with one-way valves, as 199' and 199" shown in line 166' may also be provided in line 166. The assembly of FIGURE 13 accordingly provides for compression of air by liquid 158 in the arm 171 of U-shaped sub-assembly 146 and for its discharge to and storage in the chamber 172. The same high discharge pressures (as 800–2,000 p.s.i.g.) and equivalent discharge volume and efficiencies (using the same fuel) are accordingly obtained with the device of FIGURE 13 as obtained with the device of FIGURES 1–12 above described.

The liquid 158 used in sub-assembly 146 or in FIG. 5 when air is pumped may be water. However, hydrocarbon oil may vaporize and explode at the high pressures achieved in the engine sub-assembly of this device. Accordingly, relatively inert liquid of low melting point, high boiling point, and low vapor pressure and a higher specific gravity than the fluid being pumped from such sub-assembly 141 may be used; silicone base liquid plastic is preferred for air pumping, mercury for water and oil, molten lead and molten sodium for inert gases. For purposes of keeping the molten metals liquid heating electrodes as 158 and 158' are used in tube 146. The material of which the U-tubes 145 and 146 are made may be steel when air is pumped, but tube 146 should be ceramic lined when molten aluminum, lead or zinc is being pumped, as into dies and the walls of said chamber are then heated by conventional means to maintain the metals fluid.

The fluid piston, as 251 shown in FIGURE 5, made of material inert to the combustion gases thereabove and the liquid therebelow as silicone plastic for air pumping, etc., may also be used in the embodiment of FIGURE 13.

The device of FIGURE 13 may pump from chamber 171' inert gases (fed via line 198') or water or oil or molten metal for use in dies.

In the preferred embodiment, orifice plates of adjustable internal diameter are provided as at 176 and 177 to control the frequency of oscillation of the liquid in each U-shaped tube as 146 and 147. Thereby the natural frequency of such columns of liquid can be utilized to provide a steady number of firings per unit of time. In such instance the power out-put is regulatable by increasing the pressure on the fuel fed from tank 178 through fuel regulator 179, e.g., a spring solenoid type, controlled by a motor control 180 sensitive to the pressure in the line air-supply tank 172 and providing for greater fuel charge when the line pressure falls and providing for lesser fuel charge to a fuel chamber in the injection valve such as 55 in the valve body as 52 above-described in relation to FIGURES 7, 8, and 9. Additionally, such control may also control the spring solenoid for air valve 153' and so regulate the weight of air admitted to the chamber 175 on each firing of the fuel therein thereby control the power output and the pressure in the line discharge 172. Additionally, a motor control 181 to control the speed r.p.m. of D.C. motor 156 may be provided to further control the power out-put if desired in relation to the pressure senses in air-supply tank 172.

The motor control and valve connections shown in the device of FIGURE 13 and the use of the turbine on the exhaust may be applied as desired to the device of FIGURES 1 and 12, as shown in FIGURE 5.

A modification of the assembly of FIGURE 1 to utilize the high pressure fluid provided by such assembly as a drive system is shown in FIGURE 5. According to the embodiment of this invention, the fluid 200 in the discharge manifold 40 pasess sequentially through a piston type accumulator 201, a selector valve 202, hydraulic line as 203, hydraulic motors 204 and 205, and therefrom, via piping as 206, valve 202, return line 208, reservoir 207, to fluid suction inlet 34, valve 35, chamber 36, valve 39 and manifold 40.

The accumulator 201 is provided with a piston 211, lower piston stop 212, upper piston stop 213 and a filler valve 214. Below the lower stop are fluid inlet 215 and outlet 216. The piston 211 closely, yet slidably, fits in the cylindrical portion of the accumulator between stops 211 and 212 and, in the preferred embodiment, is made of aluminum to resist corrosion and hollowed so it floats on the top of the fluid. The outlet 216 connects by pressure input line 217 to the housing 220 of valve 202. Interior housing chambers 221, 222, and 223 provide for connection of passages 225 and 226 in selector valve body 224. Accordingly, the high pressure fluid passes, via line 217, to valve housing chamber 221, valve body passage 225, valve housing chamber 222, line 203, brake chamber 230, and hence, via lines 231 and 232 to motors 204 and 205, respectively. There the axles 233 and 234 of wheels 235 and 236 are turned.

The low pressure fluid then returns via line 237 to brake chamber 240, line 206, valve body passage 226, housing chamber 223 and return line 208 to reservoir 207. A pressure relief valve 241 is provided in bridge 242.

Valve body 224 is shown in the forward drive position: a 45° rotation of the valve body 224 in the counterclockwise direction, as by handle 243, from the position as shown in FIGURE 5, would reverse the direction of drive, and a 45° rotation of the valve body in the clockwise direction would bring the valve to the neutral position. This follows from that the center of passage 225 has one of its opening 90° along perimeter of valve body 224 from the center of its other opening and passage 226 is similarly formed, and the openings of the passage 226 are each 90° from the openings for passage 225. Further, line 206 enters both housing chambers 227 and 228, the centers of which are at 135° from each other, while chamber housing 222 extends clockwise for 45° and its counterclockwise edge is located 45° clockwise from the center of chamber 228 and said chamber extends to 45° counterclockwise from center of chamber 227, all directions as seen on FIGURE 5, and chamber 227 being a cylindrical passage with its longitudinal axis normal to the axis of rotation of the valve body, while chamber 223 extends clockwise 45° from a point clockwise 45° from the center of chamber 227, while chamber 221 extends 45° counterclockwise from the point 45° counterclockwise from the center of chamber 228, which chamber is a cylindrical one with its longitudinal axis normal to the axis of rotation of valve body 224.

The reservoir 207 has a piston 247 which closely, yet slidably, fits in the cylindrical portion of said reservoir below stop 248.

A filler valve 249 provides for preserving the air 250 above said piston and pressurizing it sufficiently to return piston 251 upwards against upper stop 254. In this embodiment, pistons, as 251 and 252, upper stops as 253 and 254, and lower stops as 255 and 256, are provided in chambers 26 and 36, respectively.

A J-shaped inlet line 257 is also provided in line 30. The pistons 247, 251 and 252, like piston 211, float on the liquid used therebelow and slidably fit in the cylindrical portion of the chamber in which located. A float 260 fits about filler pipe 261 in fuel chamber 32 and valve filler cap 262 provides pressure on the air 263 above the fuel supply. Thereby the entire pump system may be operated in inverted position. Also, the piston 251 permits use of this pump of FIGURES 1 through 12 with drilling fluids that are thermally not stable, such as those drilling muds using starch as the suspension agent.

The use of a supercharger 264 is generally the same as described below for FIGURE 13. Air enters the system at air intake 266 and is pressurized by the rotor 267 for passage through valve 27. Exhaust from line 86 actuates outlet rotor 270 for energization of rotor 267.

The speed of the motor drive is controlled by foot throttle control 271 on motor 46. Motor 46 is speeded up or slowed down, with variations in power output as above discussed. Foot brake 272 actuates piston 273 and piston 274 in brake chambers 230 and 240, respectively, to control the flow of fluid through the lines 203 and 206, respectively.

Fluid 200 in chamber 207, under pressure of air 250 in reservoir 207, returns to inlet line 34 and thence to cylinder chamber 36 to repeat the fluid movement above described between combustion cylinder 36 and valve 202, motors 204 and 205, and reservoir 207 in repetition of the cycle in sub-assemblies 21, 22, and 23 above described for the devices of FIGURES 1 through 12.

Another system utilizing a process of this invention for downwell pumping and, also, comprising modifications and adaptations of the pump assembly of FIGURES 1 through 12, its components and sub-assemblies, is shown in FIGURES 14 through 17. FIGURES 14 through 17 illustrate a downwell pump system adapted to provide high fluid pressures downwell to pump fluids from great depths, and to pump substantial volumes of fluids at high pressures from great depths with a minimum of moving parts in contact with such liquids, as formation fluid 295 from underground zone 304.

The downwell pump system comprises an air compression assembly, 21, and a timing and valve assembly, as 23, constructed and interconnected as in the apparatus of FIGURES 1 through 12 and a downwell pump assembly 276. The downwell pump assembly 276 is located, at least in its sub-surface portion, in the outer casing 277. This downwell pump assembly 276 comprises a combustion chamber 278 connected at its top to the rotary injection valve 44 and, at its lower end, to the interior of a narrow combustion line 279. The interior of this narrow line 279 connects at its lower end with the enlarged interior of pump bell 280; this bell has a larger internal diameter than line 279 and is centrally located in the interior of pump chamber 282. Its lateral wall 283, top wall 284 and bottom wall 285 outline pump chamber 282. At its top the pump chamber interior connects with the interior of the pump chamber discharge line 286 through one-way valves as below described. Line 286 reaches to and over the surface 287, as shown in FIGS. 14, 15, 16 and 17. An annular passageway 294 with a cross sectional area transverse to its longitudinal axis equal to the similar cross sectional interior area of bell 280 is provided in chamber 282 peripheral to the outside of bell 280. One-way outlet valves 288 and 289 are provided in orifices therefor in top wall 284 of the pump chamber and one-way inlet valve 291 is located in the orifice therefor in the pump chamber bottom wall 285. The top wall of the pump chamber 282 is well below the static level 293 of the fluid 295 to be pumped. The casing, 277 is perforated, as at 296, to permit free flow of fluid 295 to the inlet valve. Combustion chamber 278 is provided with an ignition system as 43, and spark plug, as 37, as in the apparatus of FIGURES 1-12. The valves 288, 289, and 291 are each provided with hollow flotation chambers whereby such valves barely sink in the fluid in which to be immersed and, thereby, permit free flow of fluid therepast as shown in FIGURE 17 for valve 291 and FIGURE 15 for valves 288 and 289. It is also, within the scope of this invention that inlet valve control systems as 49 and outlet valve control systems, as 50 may be provided for each of the inlet and outlet valves in the embodiment of this invention shown in FIGURE 14.

The compressor assembly, 21 used in the embodiment of this invention shown in FIGURE 14 is in the same position and phase as above described for the air compressor assembly shown in FIGURE 1, with air entering via the one-way inlet valve 27, and level of fluid 94 in chamber 26 falling while the one-way outlet valve 28 maintains the pressure in air supply tank 29 while the level of the fluid in the reservoir box rises. During this period—the length of which is determined by the rate of rotation of the valve body 52—the rotary exhaust valve 45 is open, as is the injection valve 44. In the phase shown in FIGURE 14, gas is being discharged from the interior of the pump bell, 280. This gas volume 299 and inlet valve 291 are, in this period, urged upwardly by the difference in hydrostatic pressure resultant from the difference in the level of the static fluid level, 293 and the level of the interface, 297, of said fluid, 295, and the gas, 299, in the bell. Accordingly the level of the interface 297 approaches that of level 293; as the rate of flow through valve 291 falls to such a low value as to no longer keep such valve open, that inlet valve closes. The column of fluid 290 within the pump discharge line 286 is then supported on wall 284 and the heads of the closed valves 288 and 289.

The continued rotation of the exhaust valve 45 and rotary injection valve 44 to the position above described for FIGURE 2 results in a period during which a fuel air-charge enters the combustion chamber 278 and line 279 in the same manner and substantially under the same condition as such a charge enters the combustion chamber 36 of the embodiment shown in FIGURES 1 and 9. During this period the operations in the compressor assembly 21 and valve relations in the timing assembly 23 are as above described for the condition of the apparatus illustrated in FIGURE 2. The pump bell 280 and line 279 are filled with fluid 295 above the level of the outlet valves 288 and 290 substantially up to the static fluid level 293, i.e. to level 300 as shown in FIGURE 15.

Rotation of the rotary exhaust valve and the rotary injection valve by the driver therefor, as motor 46, to the orientation of such valves shown in FIGURE 3, followed by system 43 providing a spark across the gap of the spark plug as 37 ignites the fuel-air mixture in combustion chamber 278 and combustion tube 279 and forces the level of fluid down from level 300. Thereupon the outlet valve 291 is securely closed and, when the pressure developed by the combustion gases in bell 280 exceeds the pressure developed by the weight of the fluid in column 290 within line 286, the fluid interface level moves from 300 to 301 and fluid previously in bell 280 moves to passage 294 and upwardly towards valves 288 and 289, displacing upwardly the fluid in column 290, which fluid is then discharged from the outlet of the discharge line 286 as shown in FIGURE 15. The volume of fluid thus discharged is the volume of fluid displaced from the bell by the increase of volume of the fuel-air mixture on ignition, as from level 300 to level 301. As the fuel-air mixture used in this apparatus is injected at 200 p.s.i.g. into the volume provided for combustion, an ignition temperature of about 4,000° F. results, as in the embodiment of FIGURES 1–4. As the internal volume of the line 279 and the bell 280 from bottom of valve 44 down to level 301 is the same as the volume down from bottom of valve 44 to the gas liquid interface 107 in FIGURE 4, the same discharge pressure is developed in the apparatus of FIGURE 14 as in the apparatus of FIGURES 1–12.

Following this discharge of fluid, the valves 288 and 289 again sit in their seats 288' and 289' respectively and, as above described, support the column of fluid 290 thereabove up to the discharge level 302 of the discharge line 286. A floating piston, as 303, may be used in the chamber 280 with a stop, as 305, to positively limit the volume of the fluid discharged.

The further continued rotation of valves 44 and 45 as above described for FIGURE 4 provides an interval and apparatus connection for the passage of the gases in chamber 280—at a pressure equal to that required to open the valve 288 and 289 against the weight of fluid pressure developed at the bottom of fluid column 290—through line 279 and valve 44 through a line as 30 in assembly 21 to compress the gas in the air compressor chamber 26 as above described for the embodiment of apparatus shown in FIGURES 1–4 and thereby charge vessel 29 in the embodiment of FIGURE 14 with such compressed air for subsequent use in the system of FIGURE 14. During this interval, as shown in FIGURE 17, the inlet valve 291, closed at the beginning of such interval, begins to move upward under the influence of the difference in pressure across the head of that valve due to the above described fall in pressure within chamber 280. Accordingly fluid enters the bell 282 and raises the level of the interface from 301 in FIGURE 15 towards level 297 in FIGURE 14.

Thereafter, on further rotation of the exhaust valve to its open position as shown in FIGURES 5, 10, and 11, gases from the fluid reservoir box 25 and chamber 282 pass through the rotary exhaust valve to the air, or, preferably to a supercharger as 264, arranged and connected as in FIGURES 5 and 13. The valve 291 accordingly opens, fluid 295 enters, and level of fluid in the bell 280 thereby rises; the fall in pressure over the fluid in the fluid reservoir box reduces the pressure over fluid 94 in air compressor cylinder 26, the level of that fluid 94 drops, inlet valve 27 opens, as above described for the situation in the embodiment shown in FIGURE 5, and the cycle above described for FIGURE 14 begins again.

It will thus be seen that, according to this embodiment of this invention there is provided a pump system for providing large pressures sufficient to positively drive fluids from great depths at high pressures by apparatus requiring little maintenance because of few moving and few wearing parts and few parts contacting abrasive liquids; the entire pump is readily movable in and out of the well casing and requires no downwell electrical connections. The above described pump action is further accomplished at high thermal efficiency by the simple and sturdy apparatus above described.

Another apparatus and system within the scope of this invention is shown in FIGURES 18 and 19. This apparatus comprises an air compressor assembly, 21, a timing and valve assembly 23 in combination with a modified pump assembly 22 of FIGURE 1—generally as in the arrangement of the apparatus of FIGURES 14 to 17. This apparatus is essentially a modification of FIGURES 14 to 17 and comprises the air compressor 21, and the timing and valve assembly 23 as in FIGURES 1–12 and 14 and a pump assembly, 309. The pump assembly of this apparatus comprises an outer discharge tubing 310 within which the components of this assembly are positioned. The tubing 310 is located within a conventional well casing as 276' with perforations at 296': the static fluid level shown in FIGURES 18 and 19 would be at 293' and numbers indicated by prime (') indicate structures denominated by similar numbers in the apparatus of FIGURE 14. This apparatus and system is directed to pumping operations in extremely deep zones, such as 10 to 20 thousand feet.

The pump assembly 309 comprises a combustion chamber 311 operatively connected at its top with the valve 44 of assembly 23 and, its bottom, opening into a combustion tube, 312. The combustion tube connects at its lower end with the top of elongated cylindrical pump bell 313. A differential piston 315 having a plunger 316 attached to the bottom thereof, is slidably located in said pump bell. The pump bell is open at its bottom end, 317.

The pump bell 313 is located within elongated cylindrical pump bell housing 320 which is concentric with bell 313. The bell housing 320 is open at its top to the interior of the discharge tubing 310. The discharge tubing extends external to and concentric with combustion tube 312 to the surface 287' and there forms a discharge nozzle 322. The bottom of the bell housing operatively connects to the interior of pump barrel 325, an elongated cylindrical tube coaxial with the pump bell 313 and the housing 320: pump barrel extends downward and is open at its bottom end 326. The walls of pump barrel 325 are especially strong to withstand the pressures applied thereto. Valve partition 327 is located between the bottom of housing 320 and the top of the pump barrel 325. This partition is provided with a plurality of one-way discharge valves as 328 and 329: valve seats 328' and 329' respectively are provided for each such valve in the partition. The open bottom, 317, of the bell 313 is slightly but definitely spaced above the partition 327. The differential piston 325 slidably reciprocates along the length of the bell 313, between upper stops 330 and 330' and lower stops 331 and 331'. The plunger 316 is a cylindrical rod which passes from the bottom of the piston 325 through plate 327 with a close sliding fit when said piston is adjacent the upper stop 330. A suction valve plate 333 is provided near the bottom of pump barrel 325 at a distance from plate 327 greater than the length of the plunger 326. One-way suction valve 334 is located in a seat 334' therefor in said plate 333. The bell, 313, and the partition, 327, are located substantially below the static fluid level 293' of the liquid to be pumped: in the preferred embodiment such inlet 326 would be in the zone of the perforations 296' in the casing 276'.

In the preferred embodiment shown in FIGURES 18 and 19 there is also provided a floating piston 335 in the combustion tube 312. This floating piston slidably fits into that tube and has a density only slightly less than the fluid therebelow. The column of liquid 336 located between pistons 325 and 335 provides for the transmission of pressure between those two pistons. In the extreme deep zone pumping use of this apparatus the ability to effect such efficient transmission of pressure as is provided by that fluid column, 336, is extremely desirable.

The operation of this apparatus parallels several of the operations of the device illustrated in FIGURES 14 to 17. The position of the components of the air-compressor and valve and timing assembly of this apparatus during the power stroke (FIG. 18) parallel those of the air compressor assembly 21 and the timing and valve assembly 23 of the apparatus of FIGURE 15 and FIGURE 3 above discussed whereby is provided that, on the ignition of the fuel-air mixture in the combustion chamber 311 and combustion tube 312, the floating piston 335 is driven downwards: the column of liquid 336 transfers the pressure thus developed to the differential piston 315 and drives plunger 316 into pump barrel chamber 337. The injection of the additional volume of that plunger into that chamber forces liquid in such chamber out through the one-way valves 328 and 329 when the pressure in the chamber 337 exceeds that provided on top of plate 327 from the column of liquid 339 in the bell housing 320. This movement of fluid from chamber 337 in turn displaces fluid, as 341, in the discharge tubing 310 upward and out of its discharge opening 322. The direct transmission of pressure between the extremely deep zone 305 from which pumping of fluid 342 is provided by this embodiment of this invention and the floating piston 335 avoids any time delays required for the return of combustion gases and inherent friction losses that might be required in an apparatus as in the embodiment of FIGURES 14 through 17.

Following discharge of fluid from chambers 337 and outlet 322 the valves 44 and 45 move to the open position as above described for FIGURES 1, 4, and 5. Thereupon, as shown in FIGURE 19, the fall in pressure in the combustion tube above piston 336 and the pressure differential of fluid in the discharge tubing 310 exerted against the lower face of piston 315 returns piston 315 upward against the upper stops as 330 and 330' while valves 328 and 329 close. Concurrent withdrawal of plunger 316 out of chamber 337 reduces the pressure on top of suction valve 334 below that pressure exerted therebelow by the fluid 342 which has the static fluid level 293', thus opening valve 334 and permiting the formation fluid 342 to flow into chamber 337. Thereafter, injection of the fuel-air mixture into combustion chamber 311 and combustion tube 312 is accomplished by the procedures above described for the apparatus as shown in FIGURE 2. Since the injection pressure is below that pressure exerted by the fluid in discharge tubing 310 the piston 335 will not be forced downward until ignition of that fuel-air mixture occurs. Ignition of the fuel-air mixture in the combustion chamber 311 and combustion tube 312 drives the floating piston 335 and the differential piston 315 down again as above described for FIGURE 18.

Thus the high pressure provided by the process of FIGURES 1–12 above described are utilized by the deep zone pump apparatus of FIGURES 18 and 19 to provide extremely high pressure downwell, in chamber 337, whereby to drive fluid therefrom at the extremely high pressures met in extremely deep zones, such as 12 to 20 thousand feet, at rates which may be controlled and/or fixed by controlling and/or fixing the r.p.m. of the valve body 52 and the size of the pump plunger 316.

A device for velocity perforating and fracturing according to this invention is shown in FIGURES 20 and 21. It comprises an air compressor assembly 21 and a timing and valve assembly 23 as in FIGURE 1 connected as in FIGURE 14 together with, in the casing 344, a fracturing assembly 343 to treat a formation as 370 as shown in FIGURE 20.

The fracturing assembly according to this invention comprises an elongated cylindrical outer shell 346' which is, in turn, composed of a transmission section 347, a bell housing 348 and an extreme pressure pump barrel 349 and a side wall jet discharge section, 350. Within said shell 346' is a combustion tube 351 connected operatively at its upper end to a combustion chamber 352 and, its lower end, to a pump bell 353. A differential piston 345 is slidably located within the pump bell in the same manner as piston 315 is located in pump bell 313. The piston 345 has attached thereto a plunger 346 as does piston 315, and the piston 345 moves upward and downward between its upper piston stop 358 and the lower piston stop 359. The pump bell 353 is an elongated hollow cylinder concentric with the longitudinal axis of the housing 348. The housing 348 is provided with a valve and partition plate 361 between the chamber 362 of the extreme pressure pump barrel 349 and the interior chamber, 363, in the pump bell housing 348. A plurality of one-way valves, as 365 and 366, are located in seats therefor, as 365' and 366', respectively, therefor in the plate 361. The bottom of the pump bell is spaced away from the plate 361 sufficiently to allow fluid to pass from the interior of the pump bell 353 to the outside thereof and into the peripheral chamber 363 and to return freely therefrom. The pump plunger 346 is sufficiently long to reach from the bottom of the piston through the valve plate 361 when the piston 345 is adjacent to the upper piston stop 358. The length of the extreme pressure pump barrel is such that the pump plunger 346 reaches almost but not quite to the bottom of the chamber 362 when the differential piston is adjacent the bottom stop 359 in the pump bell 353.

The barrel 349 is built extremely sturdily to withstand the pressures applied thereto.

The extreme pressure pump barrel 349 has at its bottom a pair of diametrically opposed side-wall jets 350 and 350' and, above said jets, a one-way discharge ball valve 367 (ball 368 is resiliently fixed in position, as by spring 369, therefor) to provide for passage of fluid from chamber 362 in barrel 349 at extremely great pressures through said jets 350 and 350' to fracture the formation such as 370 where such jets contact it at points 371 and 372. Pressures of 800 p.s.i. to 2000 p.s.i. are provided to this subassembly at the floating piston 373 located in the combustion tube 351; as pressures are transmitted to a piston, as 345, of substantially larger area and result in a great multiplication (in proportion to the relative cross sectional areas of piston 345 and plunger 346) of the force applied by the plunger 346, and, accordingly, a 10 to 100 fold increase in pressure at the points 370 and 371, and even greater, as the diameter of the plunger 346 is reduced.

Accordingly, fluid forced outward of the chamber 362, on each 180° rotation of the rotary injection valve body 52 is driven into the formation 370. The following increment of fluid volume forced out of the chamber 362 drives the previously ejected fluid even deeper into the formation, as shown by the areas 375 and 376, 375 being the fluid ejected into the formation on a first half cycle of the valve 52; on the second half cycle of the fluid previously at position 376 is moved deeper into the formation, i.e., to the zone 375. Additionally, other fractures are made such as 377 in brittle formations due to the extreme pressures developed by this tool.

The movement of piston 345 shown in FIGURE 20 is effected by combustion of the fuel-air mixture in chamber 352 provided there in the same manner as provided for combustion chamber 311 and 278 above described. Following ignition of the fuel-air mixture in the combustion chamber 352 and combustion tube 351 the rotary injection valve 45 moves to the position shown in FIGURES 4 and 5 above discussed. Thereupon, the reduction in pressure above the floating piston 373 results, as shown in FIGURE 21, that the injection fluid within the section 347 would pass through the peripheral housing chamber 363 and upward inside bell 353 against the piston 345 to move said piston upward toward and against the upper piston stop 358. This movement reduces the pressure in chamber 362 sufficiently to open valves 365 and 366. Fluid from chamber 363 then enters chamber 362 and replenishes the volume previously discharged from chamber 362 into the formation 370.

Injection fluid and propping agent 340 enters shell 346' for transmission to chamber 362, pressurization in that chamber and discharge therefrom into the to-be-fractured formation as above described. Accordingly, chamber 362 would then be full with fluid and set for discharge of fluid through the valve 367 as above described on ignition of the fuel-air mixture in combustion chamber 352 and combustion tube 351 and repetition of the action above described for the device of FIGURE 20, and again drive high pressure fluid into formation 370.

The volume of fracturing fluid pumped into the formation is dependent on the rate of rotation of the valve body 52 in the timing and valve assembly 23 above described in some detail. In this system air compressor sub-assembly 21 and timing and valve sub-assembly 23, as above described, actuate the particular perforating and fracturing assembly hereinabove described. The above mentioned apparatus is freely movable up and down in the well and out of the well hole 344. The injection fluid may of course also have propping agent therein as shown in conventional procedures, such as U.S. Patent Numbers 2,699,212 and 2,337,295.

According to another embodiment of this invention shown in FIGURE 22 the combustion tube 381 is rotatably mounted on swivel bail 382, the outer shell 346' is dispensed with, and the well casing 344 is used to transmit the injection fluid and pumping agent down to where fracturing as 375', 376' occurs as in the device of FIGURES 20 and 21. This apparatus differs from that shown in FIGURE 20 by the use of packers 385 whereby the device injection fluid and propping agent 387 are directed from the annular channel 388 into pump bell housing 386, thus allowing this apparatus to be raised, lowered and rotated as desired. The device of FIGURE 22 dispenses with one set of tubing which is an economic benefit.

In this device the combustion tube 381 is provided with a floating piston 384 which connects with the pump bell 383 as above described for the device of FIGURE 20. Within bell 383 are a piston, 345', with a pump plunger 346' attached thereto, and stops as 358' and 359' all corresponding to similarly numbered components in the apparatus of FIGURE 20. The pump bell housing 386 in this case connects directly to the well casing 344 by the packer 385 whereby to transmit the injection fluid and propping agent 387 via the annular channel 388 about the combustion tube 381 into pump barrel 349'. Swivel bearing 391 allows the combustion tube 381 to rotate and accordingly rotate the extreme pressure pump barrel 349' to any position desired about the vertical axis. A mounting flange 389 supports the valve 44 on top of the swivel housing 390 and combustion tube 381 is also supported from such housing on swivel bearings 391. Otherwise, the structure and operation are the same as above described for FIGURES 20 and 21.

Yet another apparatus according to this invention, illustrated in FIGURES 23 through 26, provides a selective zone deep well pump whereby a plurality of producing zones may be selectively pumped. This apparatus comprises an air compression sub-assembly, 21, and a timing and valve sub-assembly, 23, as in FIGURE 1 and a selective deep well pump assembly 400 in combination as shown in FIGURE 23. Generally the selective zone deep well pump 400 comprises a deep well pump 401 as above described in relation to FIGURES 14 through 17, in combination with a modified deep well pump 402 thereabove operatively connected to each other through a transfer tube mechanism 403. The pump assembly 401 would be located in a lower producing zone 405 while the upper modified pump assembly 402 would be located in the upper producing zone 406. Zones 405 and 406 would be separated from each other by an impervious zone 407. A single casing 409 would provide for contacting both producing zones by perforations therein as 410 and 411 for zones 405 and 406 respectively. A packer 412 separates the upper and lower portions of the well casing and is located between the two producing zones.

The lower or deep pump assembly 401 comprises a pump housing 413 corresponding to the housing 282 of FIGURE 14, a pump bell 415 corresponding to the bell 280, a suction valve 416 corresponding to the suction valve 291 and discharge valves 417 and 418 corresponding to the valves 288 and 289 in structure and function as above described. The combustion tube 419 for pump 401 corresponds to the combustion tube 279 above described of the device of FIGURE 14 in structure and in function. Tube 419 is connected to its fuel-air mixture supply, through passage 420 of dual completion valve 421, to the valve body 52 of valve 44 and to the spark plug 37; the discharge tube 422 of pump housing 413 passes upwardly exterior and concentric to the deep zone combustion tube 419 until it has reached the level of the packer 412. Thereupon it feeds by a one-way transfer valve 414 into a pump housing of the shallow zone pump 402. The shallow zone pump assembly 402 comprises a housing 425 which connects by a discharge tube 427 through a discharge outlet 429 above the surface 428. The shallow zone pump is provided with a bell 430. This bell is connected to the valve body 52 of the timing and valve assembly 23 by its combustion tube 431 through a shallow zone combustion valve 432. The bell 430 is a vertically elongated cylinder whose axis is concentric with the longitudinal axis of the deep zone combustion tube 419 as well as its own combustion tube 431 and the axis of the housing 425. The housing 425 is provided near its top with a discharge valve partition 434 in which are located one-way discharge valves 435 and 436. Below the open bottom of the bell 430 are located one-way inlet valves 437 and one-way transfer valve 414 in a valve partition 439 at bottom of housing 425. Fluids from the producing zone 406 pass through perforations 411 in the casing 409 to the perforations 438 in that portion of the housing 425 which projects below partition 439. These fluids reach the interior of the bell 430 as below described. The deep zone discharge line, 422, feeds into transfer valve 414 of the shallow zone pump assembly 402. Transfer valve 414 is opened when deep zone pump 401 is discharging by flow of fluid from the pump bell 415 as shown in FIGURE 23 and for reasons discussed in relation to FIGURE 15. Movement of the exhaust valve 44 and the rotary injection valve 45 of the timing and valve assembly 23 of the combination with the seelctive zone deep well pump 400 as above described for FIGURES 4, 5, 16 and 17 provides that the combustion gases formed during the ignition (illustrated in FIGURES 3 and 15 and 23) may escape. The pressure above the liquid gas interface as 440 in pump bell (443 in FIGURE 24) then falls and the pressure of the formation fluid 445 in the producing zone 405 causes such fluid to flow through perforations as 410 into the suction valve 416 and force it upward. The formation fluid then enters the interior of the pump bell 415 and thereby raises the level of said interface 440. This prepares for the repetition of the cycle above described for the device of FIGURE 23, whereby the fluid within the pump bell 415 is again driven outwardly thereof to the chamber between the pump housing 413 and said pump bell, displaces the fluid there, forces it upward out through the discharge valve 417; the fluid thus displaced through discharge valve 417 displaces the fluid in the discharge line 422 and discharges it through the transfer valve 414 displacing the fluid therein through the discharge valves 436 and 435 upwardly and outwardly through the discharge tube 427 and through the outlet 429. The cycle of operation in compressor assembly 21 and timing and valve assembly 23 in this combination is the same as above described for FIGURES 1 through 5 and 14 through 17.

When dual completion valve 421 is turned to close passage 420 and open shallow zone passage 432 therein, transfer valve 414 is kept shut and the operation of the pump of shallow zone assembly 402 generally parallels that shown in FIGURE 14, i.e. the combustion tube 431 for the shallow zone pump 402 provides—by cooperation with the air compressor assembly 21 and the timing and valve assembly of FIGURES 1 through 12—for displacement of the fluid in the bell 430 and discharge thereof between the bell 430 and the bell housing 425: thereby such fluid passes upwardly through valves 435 and 436, through the discharge tubing 427, and out through the outlet 429 as shown in FIGURE 25. This discharge occurs on ignition of the fuel-air mixture provided to the combustion tube 431 in the same manner as provided to the combustion tube 279 of FIGURE 15. Then the above-described rotation of valves 44 and 45 of assembly 23 of this selective zone deep well pump follows the expansion of the ignited fuel-air mixture to form combustion gases: the opening of such valves, as in FIGURE 26, releases combustion gases from the pump bell chamber and charges the air compressor system 21 as above described for such assembly 21 in FIGURE 4 as well as FIGURE 16. The pressure above the gas-liquid interface 441 in the shallow zone pump bell 430 falls and formation fluid 444 from the zone 406 passes through the perforations 411 in the casing 409 to drive the level of fluid upward by passing through the tubing perforations 438 in the housing 425 and lifting the suction valve 437 whereby the shallow zone pump system 402 is again in the same position and its component parts in the same orientation as above described for the assembly shown in FIGURE 24 (and similar to FIGURE 14). Thereupon, the air compression system 21 and the timing and valve assembly 23 of the selective deep well pump combination shown in the FIGURE 23 again cooperate to again provide a fuel-air mixture to the combustion chamber and combustion tube for the shallow zone pump system 402. Ignition of this fuel-air mixture causes expansion of those gases and a repetition of the operation above described for FIGURE 25.

It is thus seen that, according to this combination of components of this invention including those of the pump above described in FIGURES 1–12, there is provided a selective zone deep well pump which permits pumping formation fluid at high efficiencies with a minimum of wear to the operating parts and providing high pressures down well and provides for selectively pumping any of a plurality of producing zones. This is especially adapted to a dual completion well (as an example of a multi-zone pumping operation) as above described in relation to FIGURES 23 through 26.

The dual completion valve 421 shown generally in FIGURES 23 through 26 and in more detail in FIGURE 29 comprises a housing 446 with a valve body chamber therein of truncated conical interior shape wherein valve rotor 447—which is of corresponding truncated conical exterior shape—rotatably yet firmly fits. The rotor is provided with deep zone passage 420 and shallow zone passage 432. Deep zone passage 420 is generally parallel to the longitudinal axis of the rotor and connects neck 63 of the valve 44 in this combination—through corresponding passages in the housing 446—with deep zone combustion tube 419. Shallow zone passage 432 is at a slight angle to the axis of the valve rotor body and connects—through corresponding passages in the housing 446—to neck 63 of the valve 44 of this assembly and the shallow zone combustion tube 431. In the preferred embodiment the rotor has a 12 inch overall length and a 6 inch maximum diameter. Drive shaft 448 for rotor 446 is located with its axis on the longitudinal axis of the rotor for rotation thereof as desired to connect or disconnect either of passages 420 or 432. The position of passages 420 and 432 in the disposition of components shown in FIGURES 23 and 24 are shown in solid lines in FIGURE 29; the position of the same passages in the arrangement shown in FIGURES 25 and 26 are indicated as 420' and 432' and shown in dotted lines in FIGURE 29. Rotor 447 is, in the preferred embodiment, made of hardenable stainless steel, as type 440C, hardened and finely machined to ±.0001 inch after preliminary machining and grinding work thereon has been done, as with the valve bodies for valves 44 and 45, as above described. Lubrication is effected with, for instance, high temperature resistant lubricant.

According to this invention, the lower liquid producing zone may be pumped separately for a series of strokes as above described followed by pumping of the upper zone. Also within the scope of this invention is the sequence of operation to pump a first liquid producing zone as 406 for one cycle of operation as above described, then to pump another liquid producing zone (as 405), then similarly to pump the first zone again, then the second, etc., thereby relatively steadily pumping a plurality of zones over a given period of time. The valve rotor may be made with a right cylindrical exterior outline in a pump valve housing chamber of corresponding interior shape and the valve housing and rotor provided with a coolant inlet and outlet as for the valve housing and rotor in valves 44 and 45 above. Antigas lock valve 468 is important when pumping where inherent gas pressure buildup exists as below packer 412. It opens due to pressure differential, e.g. if gas is present (FIGS. 14 and 24) but is closed by light spring and pressure differential.

Another device especially adapted to be used with the embodiment of the invention as shown in FIGURE 13 is a ram jet compressor assembly shown in FIGURE 27 and FIGURE 28. FIGURE 27 is an overall view including the kelly assembly 450 and the supporting swivel 451 of the ram jet compressor 452. The ram jet assembly is supported on swivel bail 453. A gooseneck air supply line 455 enters a rotatable swivel 451 supported on bail 453. A high tension line 456 enters the gooseneck through a gland nut 457 provided therein for the fuel line 459. A probe gland 460 for the spark probe 461 is provided within the fuel line 459 as shown in FIGURE 28. A fuel regulator 462 is provided in fuel line 459 and is controlled by a temperature and pressure sensitive controller 463: this controller is actuated by a bleeder line extending thereto from the line 455. The air channel 464 within the air line 455 extends through the vertically elongated swivel sub 465 with probe 461 enclosed therein down through the pressure bell 466 and into the combustion chamber 467 located in the center of the vertically elongated hollow ram jet barrel 469. An open gas passage extends downward from the combustion chamber 467 through the kelly combustion tube 470 but separated from the interior wall of said tube by an annular space 471, to the discharge nozzle 472.

FIGURE 28 shows the ram jet barrel and the region of the probe gland 460 in some detail. Barrel 469 is an elongated hollow cylinder. An annular ram jet thrust head, 484, with a central orifice, described in detail below, divides the central hollow space within said barrel 469 into an upper bulbous pressure bell 466 and a lower combustion chamber 467.

The pressure bell 466 has a circular cross section generated symmetrically about a central vertical axis through which the spark probe 461 passes. The probe has, in the preferred embodiment, a stainless steel, type 310, cylindrical shield 476 concentric with and enclosing high temperature line 456. Ceramic insulation 477 fills the space between the said shield and said line 456. A ground electrode 479 is attached to the hollow cylindrical metallic fuel tube 480, which tube is concentric with the shield 476 extends from the fuel line 459 and is supported by the gland nut 457. The channel in fuel tube 480 provides an annular passage 481 for the passage of fuel from the line 459 through gland 457 to the combustion zone 467. The tube 480 is perforated, as at 482 and 482', to provide a downwardly directed spray, 483, of fuel at the level of the electrode 479. The bottom end of the tube 480 is expanded as shown in FIGURE 28.

The ram jet thrust head 484 contains a plurality of concentrically arranged upwardly open cool air intakes 485 and 486 therein. The ram jet thrust head also supports therebelow three concentric tubes, central combustion tube 497, primary combustion tube 498, and secondary combustion tube 499. The ports, as 485, and 486, each provide for passagge of cooling air through the spaces peripheral to each of these three concentric cool air tubes i.e. primary cooling air parallel and immediately peripheral to the central combustion tube 497, secondary cooling air parallel and immediately peripheral to the primary cool air tube 498, and tertiary cooling air parallel and immediately peripheral to the secondary cool air tube 499. Central combustion tube 497 is provided with a plurality of downwardly and inwardly directed perforations as 501 and 501' for passage of primary cooling air from between tubes 497 and 498, for reasons below described. The ram jet barrel 469 is tapered conically at 502 below the fuel combustion zone 467 to drive the secondary and tertiary cooling air through the perforations as 503, also downwardly and inwardly directed through the tube 497.

Ram jet thrust head 484 has a centrally projecting portion 487 which, with fuel tube 480, defines the ram jet air intake orifice 489. The bulbous portion of the probe 461 is below the narrowest portion of such orifice and is also below the vena contractor of the gas flow passing through that orifice in the normal operation of this apparatus.

In a preferred embodiment of this invention the overall length of the assembly of FIGURE 28 would be 10 feet overall from the top of barrel 469 to bottom discharge 472 with an overall diameter of 8 inches and weigh approximately 1,000 pounds. Such an apparatus would take in some 1800 cubic feet per minute of free air at 60° F.; the discharge thereof would be at 500° F. this would consume about one hundred pounds of propane per hour and provide about 250 horsepower output on a B.t.u. per minute input of approximately 33,200 B.t.u. In operation combustible fuel enters through line 459 and is passed via fuel line 480 to the combustion chamber 467. A conventional spark system as a conventional vibratory ignition pack provided with a conventional ON-OFF switch, operating across the electrode 479 to the hot spark wire 456 provides—with air entering through line 455—a substantially continuous flame 483 in the combustion zone 467. The combustion air which enters the combustion chamber through the ram jet orifice 489 is super heated by the combustion process to some 2,000° F. Only about one quarter of the total amount of the air fed through line 455 is so heated; about ¾ of the total volume of air passing through line 455 passes through the cooling ports as 485 and 486. Such cooling air is distributed by the cool air passages in ram jet head 484 to the three spaces between the three concentric cool air tubes and the wall 469 of the ram jet barrel. Boundary layer cooling air from the primary cooling air channel between tubes 497 and 498 flows through the ports as 501, 501' along the interior surface of the central combustion tube 497 and thus prevents the combustion chamber 467 from overheating. This primary cooling air also insulates the secondary cooling air between tubes 498 and 499 and tertiary cooling air between tubes 499 and the interior surface of the barrel 469 throughout the length of the ram jet barrel.

The secondary and tertiary cooling air are mixed at the end of the combustion chamber at zone 502 and then are used to insulate the kelly wall throughout its entire length and to furnish boundary layer cooling air to the kelly combustion tube, 470, by passage of a portion of said air through the orifices 503, 503' in the kelly combustion tube. This boundary layer of cooling air thus protects that combustion tube from the high temperatures of the gases passing therethrough and thereby maintains the temperature of the Kelly below 180° F. The combustion tube discharge nozzle 472 directs the central super heated air stream and the boundary layers down the center of the drill stem in their same relative positions thereby retarding the complete mixing of the two air streams and thus lowering the operating temperature of the metal of the first drill stem.

In starting, an air compressor as the system of FIGURE 13 forces compressed air through the drill string. The ignition system is then turned on. Fuel is then metered through the fuel spray nozzles 482 and 482' at the proper rate as determined by the measurement of air pressure and temperature in the conventional control apparatus 463.

In stopping, the fuel regulator system is turned off first and fuel pressure manually and gradually reduced to decrease the combustion chamber temperature to the normal safe shut-down level; then the fuel shut-off valve is closed. Thereafter the ignition system is turned off.

Reed valves 505 as shown in FIGURE 30 are used in the preferred embodiments of the compressor sub-assembly 21 of the assemblies hereinabove disclosed. Such reed valve is used in line between the compressor valve outlet to valve 28 and chamber 29 in the embodiment of FIGURES 1 through 11 in place of the check valve generally shown as 28 and positioned in dotted lines in FIGURE 4 and as shown in dotted line at 505' in line 151 of the embodiment of FIGURE 13 in place of valve 150 or in place of valve 172' of FIGURE 13. Such reed valves may be used in parallel or in larger size where greater capacities are desired.

Such reed valve comprises an elongated cylindrical outer shell 506, 6 inches internal diameter, closed at one end 507 and open at its opposite inlet end 508. An exit tube 510, elongated and cylindrical in shape is located internal of tube shell 506 and coaxial therewith; it is 4 inches internal diameter, closed at one end, 511 and open at its exit orifice 512 and provided with a plurality of ⅛ inch diameter perforations as 513, 513', 513'' (providing a total perforation area 3 times the area of orifice 512) as air inlet holes; these holes are spaced ⅜ inch center to center and arranged in parallel lines behind the equispaced reed valve fingers, as 515, 516, 517, 518, 519, 520, and 521, each six inches long and 3/16 inch wide and elastically held in place by a head ring 522. The valve fingers are separated from one another by ⅛ inch grooves and made of thin flexible stainless steel and extend over and in direct contact with the orifices of the valve perforations as 513, 513', etc., to the interior of tube 510. Tube 510 has a taper of .06″ per foot to slightly compress the fingers at their lower end. Such valves provide substantially greater air inlet area than the ball valves shown, for purposes of simplicity, as illustrative of conventional check valves which may be used. The valve housing 506 may be replaced by an air filter for use of these reed valves as an inlet check valve; then such modified reed valve would substitute for inlet check valve 27 of FIGURES 1 through 11 and inlet check valve 167 and 166″ of FIGURE 13.

As many possible embodiments may be made of the invention without departing from the scope thereof, it is to be understood that all matter herein set forth or

We claim:

1. Apparatus for pumping fluid comprising a combustion chamber with an inlet for air and an inlet for fuel and a gas discharge outlet near the top thereof, valve means in each of said inlet and outlet for opening and closing each of said inlet and outlet, an air compressor and gas compressing means in said compressor and air compressor discharge means operatively connected to said compressor, said air compressor discharge means opening through and opening and closing valve means to an air reservoir tank, said tank opening through an opening and closing valve means to said inlet for air and through a valve means to said inlet for fuel and the gas discharge outlet of said combustion chamber operatively connected through an opening and closing valve means to said gas compressing means within said gas compressor.

2. A device as in claim 1 wherein a valve housing is operatively connected to said combustion chamber and opens thereinto, said housing having therein a cylindrical cavity, said housing having, spaced apart from each other, air inlet and outlet orifices and exhaust inlet and outlet orifices, each extending from the cavity in the interior of said housing to the exterior of said housing, a cylindrical valve body rotatably fitting into said cavity, a plurality of passages through said valve body, one such passage connecting the exhaust orifices of said housing and providing for exhaust from said combustion chamber through said valve housing in one position of said valve body in said housing, another passage in said valve body connecting the air inlet orifices of said housing and providing for air inlet to said combustion chamber through said valve housing in another position of said valve body in said housing, said passages having their openings at different points on said valve body whereby only one of said passages connects said combustion chamber and the exterior of said housing at the same time, and a timing and ignition means operatively connected to said valve body for rotating said valve body in said housing and for igniting a fuel-air mixture in said combustion chamber when neither of said passages is open to said chamber.

3. A device as in claim 1 wherein a liquid fills the bottom of the combustion chamber, an inlet valve in the combustion chamber is below the level of said fluid, and including means to shut the inlet valve in said combustion chamber when the level of liquid in said combustion chamber has reached a predetermined level.

4. A device as in claim 3 wherein the means for shutting the valve in the combustion chamber comprises an electric circuit and a solenoid, said electric circuit being actuated by said fluid reaching said predetermined level and said electric circuit providing actuation for said solenoid, said solenoid moving said inlet valve.

5. A device as in claim 3 wherein the means for closing said valve includes a piston on which floats top of said fluid in said combustion chamber and stops for said piston, said stops being attached to the interior walls of said combustion chamber.

6. A device as in claim 1 wherein the combustion chamber is connected at its bottom with a second closed chamber containing liquid, and said liquid presents a gas liquid interface to the interior of said combustion chamber, is said second chamber and provided at its top with inlet and outlet valve openings, respectively closed by one-way inlet and outlet valves, an outlet valve thereof opens to a third chamber for storing gas under pressure, said third chamber being operatively connected to means for discharging said gas, under said pressure, from said third chamber into said combustion chamber.

7. A device as in claim 2 wherein the valve body has a fuel recess with an opening on the exterior of said body, said recess being adapted to contain a definite volume of fuel, and the valve housing has fuel passages therethrough, one of which passages is open at one end to the exterior of said housing and the other end of said passage has an opening to said housing cavity, and a second fuel passage has one end thereof open to said housing cavity, and the other end of said second fuel passage opens to the air outlet orifice of said housing, and said fuel passages are interconnected through said fuel recess only when said fuel recess opening is contiguous to the openings of said fuel passages to said cavity.

8. A device as in claim 7 wherein the compressor assembly comprises two fluid-tight enclosed chambers open to each other through bottom portions thereof, fluid in the bottom of each of said chambers, a gas inlet on the top of a first one of said chambers, an upward extension on the other chamber extending above the level of the top of said first chamber, said extension having inlet and outlet valves at its top, a gas reservoir connected to said outlet valve, an outlet from said reservoir, a pressure regulator on said air reservoir outlet, and said air reservoir outlet opening into said air inlet of said combustion chamber.

9. A device as in claim 2 including also a one-way outlet valve in the combustion chamber which outlet valve in said combustion chamber connects via liquid conduits to the inlet valve thereof through a motor driven by said liquid, and an adjustable valve determining the direction of drive of said motor by said fluid.

10. A device as in claim 1 adapted to pump liquid from an underground well wherein the level of said liquid is below the ground surface and the said air compressor and valve housing and timing mechanism therefor are above the ground wherein the combustion chamber comprises a vertically elongated hollow tube enlarged at its bottom portion and extending from said ground surface to below the level of said liquid in the well and having an opening near its bottom, a chamber surrounding said opening, said chamber having a bottom valve plate with a one-way valve therein, said plate being portioned below said opening, said valve permitting liquid flow into said chamber, and said chamber having an upper valve plate below the level of the liquid in said well and above the level of said opening in said first tube, said upper valve plate supporting a one-way valve permitting liquid flow upward therethrough, and a second tube extending from said latter valve to above the surface of the ground, and there provided with a discharge orifice.

11. A device as in claim 10 for selectively pumping liquids from each of a plurality of underground strata wherein the level of the liquid in one of said strata is below a water impervious layer and the said air compressor and valve housing and timing mechanism therefor are above the ground, wherein the combustion chamber comprises a first vertically elongated hollow tube extending from the ground surface to below the level of the liquid in a lower first stratum and said tube is enlarged and has an opening near its bottom, a first housing chamber surrounding said opening, said first housing chamber having a bottom valve plate below said opening, said plate being below and in contact with said opening and said valve plate having a one-way valve contacting the liquid of said lower stratum and permitting liquid flow into said first housing chamber and said first housing chamber having an upper discharge valve plate below the level of the liquid in said first lower stratum, and above the level of said opening, a one-way discharge valve in said latter plate permitting liquid to flow upward through said valve, and a third second tube extending upward from said one-way discharge valve to a second housing chamber located above said impervious stratum, a second vertically elongated hollow tube extending from the surface to below the level of liquid in the well above said first mentioned stratum, said tube having an opening near its bottom, said second housing chamber surrounding said opening, said second housing chamber having a bottom valve plate with a one-way valve below said opening permitting liquid from said upper stratum to flow into said second housing chamber and, also, a one-way valve means in said plate for permitting liquid flow from said third tube into said second housing chamber, said second housing chamber having an upper valve plate below the level of the liquid in said second stratum and above the level of said opening in said second tube, said valve plate supporting a one-way valve permitting liquid flow upwardly therethrough, and another vertical tube extending from said latter one-way valve to the surface of the ground, and valve means selectively connecting either one of said vertically elongated hollow tubes to said valve housing.

12. A device as in claim 1 adapted to pump liquid from a well wherein the level of said liquid is below the ground surface and the said air compressor and valve housing and timing mechanism therefor are above said ground and wherein the combustion chamber comprises a vertically elongated tube and said tube is connected to a first bell shaped chamber which chamber has an opening at its lower end and has a greater horizontal cross-section area than said tube, a piston slidably fitting in said first chamber, a plunger of less diameter than said piston attached to said piston and projecting through and below said opening, a second chamber surrounding said opening and having a top valve plate below said opening, and below the level of liquid in said well a second tube connecting said second chamber to the surface, said top valve plate having therein a one-way valve permitting flow of liquid into said second chamber, said plunger slidably fitting into and passing through said top valve plate, the interior of said second chamber connecting through said valve to a third chamber therebelow, and said plunger extending into said third chamber, said third chamber having a one-way valve permitting flow of liquid from said well into said third chamber, said one-way valve contacting the liquid in said well.

13. A combination of the device of claim 6 and a ram jet compressor device attached to the said means for discharge of gas storage, said ram jet compresser comprising an inlet tube operatively connected to a hollow shell, said shell being divided by an annular transverse partition into a bell chamber above said partition and a combustion chamber therebelow; a fuel line passing through and below the central orifice in said annular partition and a wall of said fuel line being made of electrically conductive material and being electrically connected to a circuit including a high voltage spark line, a plurality of radially spaced apart concentric tubes depending from said partition and providing a series of annular spaces between said tubes and orifices extending from the top of said partition plate to said spaces between said tubes, and the innermost of said concentric tubes being provided with a plurality of downwardly and centrally directed passageways through said innermost tube.

14. A combination of the device of claim 6 with a ram jet compressor comprising and an inlet tube operatively connected to a hollow shell, said shell being divided by an annular transverse partition into a bell chamber above said partition and a combustion chamber therebelow; a fuel line passing through and below the central orifice in said annular partition and a wall of said fuel line is made of electrically conductive material and is electrically connected to circuit including a high voltage spark line, a plurality of radially spaced apart concentric tubes depending from said partition and providing a series of annular spaces between said tubes, and orifices extend from the top of said partition plate to said spaces between said tubes, and the innermost of said concentric tubes is provided with a plurality of downwardly and centrally directed passageways through said innermost tube, the said gas storage discharge means being operatively connected to said inlet tube.

References Cited by the Examiner

UNITED STATES PATENTS

| | | | |
|---|---|---|---|
| 671,775 | 4/01 | Dunham et al. | 103—249 |
| 1,210,679 | 1/17 | Ostenberg | 103—249 |
| 1,240,967 | 9/17 | Griffith | 103—249 |
| 1,257,217 | 2/18 | Griffith | 103—249 |
| 1,758,346 | 5/30 | Arutunoff | 103—249 |
| 2,272,477 | 2/42 | Pfleger | 103—249 |
| 2,532,635 | 12/50 | Miller | 103—249 |
| 2,699,125 | 1/55 | Scott | 103—249 |
| 2,716,454 | 8/55 | Abendroth | 166—42 |
| 2,753,940 | 7/56 | Bonner | 166—42 |
| 2,947,318 | 8/60 | Odom | 137—625.19 |
| 3,008,491 | 11/61 | Riefler | 137—625.19 |

FOREIGN PATENTS 15,820   7/10   Great Britain.

LAURENCE V. EFNER, *Primary Examiner.*

CHARLES C. O'CONNELL, *Examiner.*